(12) United States Patent  
Kono et al.

(10) Patent No.: US 8,831,083 B2
(45) Date of Patent: Sep. 9, 2014

(54) TRANSMISSION CHANNEL ESTIMATING DEVICE, TRANSMISSION CHANNEL ESTIMATING METHOD AND RECEIVING APPARATUS

(75) Inventors: Ryuichiro Kono, Tokyo (JP); Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/997,952

(22) PCT Filed: Nov. 30, 2011

(86) PCT No.: PCT/JP2011/077636
§ 371 (c)(1),
(2), (4) Date: Jun. 25, 2013

(87) PCT Pub. No.: WO2012/127740
PCT Pub. Date: Sep. 27, 2012

(65) Prior Publication Data
US 2013/0294493 A1 Nov. 7, 2013

(30) Foreign Application Priority Data
Mar. 23, 2011 (JP) ................................. 2011-063901

(51) Int. Cl.
H03H 7/30 (2006.01)
H03H 7/40 (2006.01)
H03K 5/159 (2006.01)
H04B 3/46 (2006.01)
H04B 3/10 (2006.01)
H04L 25/02 (2006.01)
H04B 7/005 (2006.01)

(52) U.S. Cl.
CPC .............. *H04L 25/0202* (2013.01); *H04B 3/46* (2013.01); *H04B 3/10* (2013.01); *H04B 7/005* (2013.01)

USPC ........................... 375/232; 375/229; 375/346

(58) Field of Classification Search
USPC ................................. 375/229–236, 346–350
See application file for complete search history.

(56) References Cited

U.S. PATENT DOCUMENTS 6,125,151 A 9/2000 Chiba
8,279,953 B2 10/2012 Uesugi et al.
(Continued)

FOREIGN PATENT DOCUMENTS

EP 0 615 347 A1 9/1994
JP 2-268526 A 11/1990
(Continued)

*Primary Examiner* — Curtis Odom
(74) *Attorney, Agent, or Firm* — Birch, Stewart, Kolasch & Birch, LLP

(57) ABSTRACT

Provided are a transmission channel estimating device, a transmission channel estimating method, and a receiving apparatus. A transversal filter unit generates an estimated reception signal on the basis of a stored known signal sequence and tap coefficients, generates an error signal on the basis of a difference between a reception signal and the estimated reception signal, generates updated tap coefficients on the basis of the known signal sequence, the tap coefficients and the error signal, designates an effective section formed by a predetermined number of taps out of a plurality of taps in the transversal filter unit 2, and designates a first section and a second section set so as to include a center tap, wherein the generation of the estimated reception signal and the updated tap coefficients is performed by generating an estimated reception signal and updated tap coefficients for the first section and generating an estimated reception signal and updated tap coefficients for the second section.

19 Claims, 17 Drawing Sheets

(56) References Cited

U.S. PATENT DOCUMENTS

| | | |
|---|---|---|
| 2003/0152144 A1 | 8/2003 | Horng et al. |
| 2005/0265439 A1* | 12/2005 | Matsumura et al. .......... 375/232 |

FOREIGN PATENT DOCUMENTS

| | | |
|---|---|---|
| JP | 2-285819 A | 11/1990 |
| JP | 2-296409 A | 12/1990 |
| JP | 3-235511 A | 10/1991 |
| JP | 7-219557 A | 8/1995 |
| JP | 8-250981 A | 9/1996 |
| JP | 8-251244 A | 9/1996 |
| JP | 9-93088 A | 4/1997 |
| JP | 2003-332951 A | 11/2003 |
| JP | 2005-518152 A | 6/2005 |
| JP | 2007-28155 A | 2/2007 |
| JP | 2007-235407 A | 9/2007 |
| JP | 2009-122596 A | 6/2009 |
| WO | WO 94/07311 A1 | 3/1994 |
| WO | WO 2006/077729 A1 | 7/2006 |

\* cited by examiner

US 8,831,083 B2

TRANSMISSION CHANNEL ESTIMATING DEVICE, TRANSMISSION CHANNEL ESTIMATING METHOD AND RECEIVING APPARATUS

TECHNICAL FIELD

The present invention relates to a transmission channel estimating device and a transmission channel estimating method for estimating a transmission channel from a reception signal in which a known signal sequence is inserted in a predetermined section, and a receiving apparatus which includes the transmission channel estimating device.

BACKGROUND ART

In digital transmission systems, distortions occur in transmission signals because of various factors such as signal transmission channel distortions, signal reflections, and changes in transmission channel characteristics in mobile radio communications or broadcast receiving systems. For this reason, it is required for receiving apparatuses to compensate distortions in transmission signals by a distortion compensation technique using waveform equalization, a transmission channel estimation technique for estimating states of transmission channels, an error correction technique and other techniques, to reproduce desired signals.

In order to perform synchronous reproduction and waveform equalization of reception signals stably or efficiently in receiving apparatuses, transmission systems for transmitting signals to which predetermined known signals are inserted have been practically used in the fields of broadcasting and communication. If these known signals have longer signal sequence lengths, synchronous reproduction, waveform equalization, transmission channel estimation and the like can be realized with higher accuracy in receiving apparatuses; but transmission speeds relatively decrease in transmission of information which is desired to be transmitted. For this reason, it is required to achieve transmitting/receiving systems capable of performing stable transmission/reception while desired information transmission speeds are secured.

Generally, in waveform equalizers that use a known signal as a teacher signal and CIR detectors that estimate a CIR (Channel Impulse Response) in a transmission channel from a known signal, digital filters such as transversal filters or decision feedback equalizers are used. Generally, in the waveform equalizers, a known signal is used as a teacher signal for making outputs obtained by filtering a reception signal closer to the known signal. As for the CIR detectors, a known signal is generally used as an input signal to filters. Filter coefficients are successively updated by an adaptive algorithm such as an LMS (Least Mean Square) algorithm. There is a problem that if a known signal sequence length is short, a filter coefficient cannot converge to an optimum value and a waveform equalizer or a CIR detector cannot obtain a desired performance.

To cope with such a problem, a method for repeatedly using a same known signal sequence to increase a known signal sequence length in appearance is proposed (see Patent Document 1, for example).

PRIOR ART DOCUMENT

Patent Document

Patent Document 1: Japanese Patent Application Publication No. 3-235511 (FIG. 1)

SUMMARY OF THE INVENTION

Problem to be Solved by the Invention

The method described in Patent Document 1 has a problem that although the method is effective when the known signal sequence length is longer than a filter tap length to some extent, sufficient effectiveness cannot be obtained when the known signal sequence length is equal to the filter tap length and an update of filter coefficients itself cannot be carried out when the known signal sequence length is shorter than the filter tap length.

For example, in ATSC-M/H (Advanced Television Systems Committee-Mobile/Handheld) which is a standard for mobile terrestrial DTV (Digital Television) in the U.S.A., two kinds of signals are used as known signals, i.e., FS (Field Sync) and TRS (Training Sequence). The FS is a known signal sequence of about 700 to 800 symbols in length and the TRS is a known signal sequence of 1424 symbols in length. When a CIR detection range of 90 μs is set at a symbol rate of 10.76 MHz, a tap length of about 970 symbols is required for a filter. When this filter is used, it is possible to update tap coefficients using the TRS as a known signal and it is impossible to update tap coefficients using the FS as a known signal.

The present invention is made to solve the problem in the above-mentioned conventional art, and an object of the present invention is to provide a transmission channel estimating device and a transmission channel estimating method capable of achieving a desired performance even if a known signal sequence length is equal to or shorter than a tap length, and a receiving apparatus which includes the transmission channel estimating device.

Means for Solving the Problem

According to an aspect of the present invention, a transmission channel estimating device for estimating a transmission channel from a reception signal in which a known signal sequence is inserted and transmission data is digitally modulated, includes: a reception-signal storage unit for storing the reception signal; a known-signal-sequence storage unit for storing a known signal sequence which is the same as the known signal sequence inserted in the reception signal; a tap-coefficient storage unit for storing tap coefficients; a transversal filter unit including a plurality of taps, the transversal filter unit generating an estimated reception signal on the basis of the known signal sequence stored in the known-signal-sequence storage unit and the tap coefficients; a subtracting unit for generating an error signal on the basis of a difference between the reception signal and the estimated reception signal; a tap-coefficient updating unit for generating updated tap coefficients on the basis of the known signal sequence, the tap coefficients and the error signal to replace the tap coefficients stored in the tap-coefficient storage unit with the updated tap coefficients; and a tap-section setting unit for designating effective sections formed by a predetermined number of taps out of the plurality of taps in the transversal filter unit, wherein: the tap-section setting unit designates a first section which is set so as to include a center tap and a second section which is set so as to include the center tap, as the effective sections in the plurality of taps in the transversal filter unit, and the generation of the estimated reception signal by the transversal filter unit, the generation of the updated tap coefficients and the replacement in the tap-coefficient storage unit by the tap-coefficient updating unit are performed by generating an estimated reception signal and generating and rewriting updated tap coefficients in the tap-coefficient storage unit for the first section, and generating an estimated reception signal and generating and rewriting updated tap coefficients in the tap-coefficient storage unit for the second section.

According to another aspect of the present invention, in a method for estimating a transmission channel which is carried out by a transmission channel estimating device including a known-signal-sequence storage unit for storing a known signal sequence which is the same as a known signal sequence inserted in a reception signal, a transversal filter unit including a plurality of taps, and a tap-coefficient storage unit for storing tap coefficients, the method for estimating a transmission channel from a reception signal in which a known signal sequence is inserted and transmission data is digitally modulated, includes the steps of: storing the reception signal in a reception-signal storage unit; generating an estimated reception signal on the basis of the known signal sequence stored in the known-signal-sequence storage unit and tap coefficients stored in the tap-coefficient storage unit; generating an error signal on the basis of a difference between the reception signal and the estimated reception signal; generating updated tap coefficients on the basis of the known signal sequence, the tap coefficients and the error signal to replace the tap coefficients stored in the tap-coefficient storage unit with the updated tap coefficients; and designating effective sections formed by a predetermined number of taps out of the plurality of taps in the transversal filter unit, wherein: a first section set so as to include a center tap and a second section set so as to include the center tap are designated, as the effective sections in the plurality of taps in the transversal filter unit, and the generation of the estimated reception signal in the step of generating the estimated reception signal, and the generation of the updated tap coefficients in the step of generating the updated tap coefficients to replace the tap coefficients stored in the tap-coefficient storage unit with the updated tap coefficients are performed by generating an estimated reception signal and generating and rewriting updated tap coefficients in the tap-coefficient storage unit for the first section, and generating an estimated reception signal and generating and rewriting updated tap coefficients in the tap-coefficient storage unit for the second section.

According to another aspect of the present invention, a receiving apparatus includes a receiving unit for receiving a signal; a transmission channel estimating unit for estimating a transmission channel for the signal received by the receiving unit; and a compensating unit for compensating the signal received by the receiving unit according to a result of the estimation by the transmission channel estimating unit, wherein the transmission channel estimating unit is the transmission channel estimating device described above.

Effects of the Invention

According to the transmission channel estimating device and the transmission channel estimating method of the present invention, even if a known signal sequence length n does not have an enough length for obtaining performance in m taps, sufficient update frequency can be obtained and transmission channel estimation can be achieved with higher accuracy.

Moreover, according to the transmission channel estimating device and the transmission channel estimating method of the present invention, even if the known signal sequence length is shorter than the number of taps, a transmission channel can be estimated by appropriately selecting a first section and a second section.

Furthermore, according to the transmission channel estimating device and the transmission channel estimating method of the present invention, sufficient update frequency can be obtained by updating tap coefficients near a center tap which is important for transmission channel estimation in both of a first section and a second section. Therefore, a result of transmission channel estimation can be obtained with higher accuracy.

In addition, according to the receiving, apparatus of the present invention, since a reception signal can be compensated according to a result of transmission channel estimation with high accuracy, quality of received data can be improved.

MODE FOR CARRYING OUT THE INVENTION

First Embodiment

Figure 1:
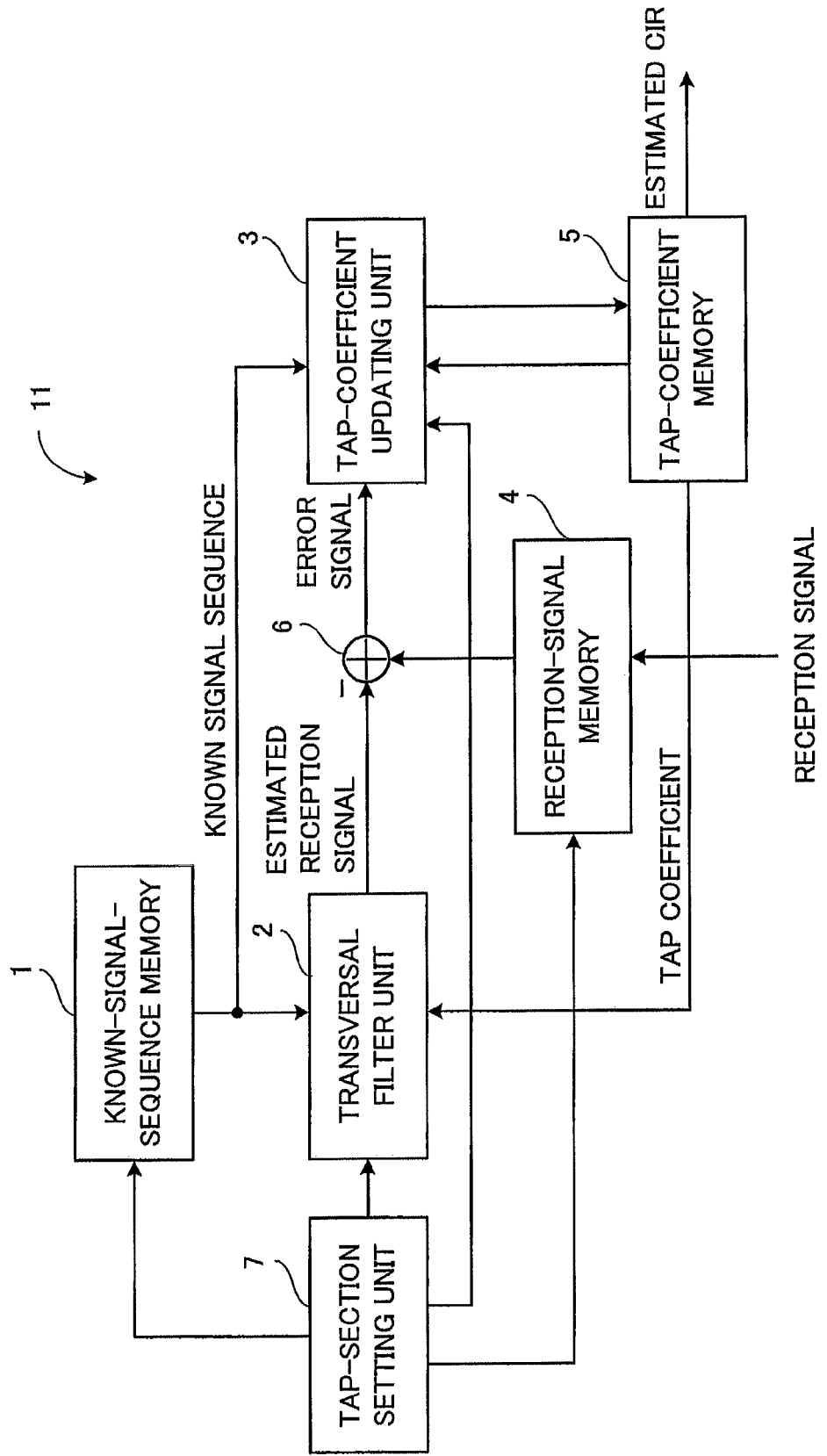
FIG. 1 is a block diagram schematically illustrating a configuration of a transmission channel estimating device according to a first embodiment of the present invention.

FIG. 1 is a block diagram schematically illustrating a configuration of a transmission channel estimating device according to a first embodiment of the present invention (i.e., a device capable of carrying out a transmission channel estimating method according to the first embodiment). The transmission channel estimating device 11 according to the first embodiment is a device that receives a signal, in which a signal sequence known by both of a transmitting end and a receiving end is inserted in a predetermined section and transmission data is digitally modulated, and estimates a transmission channel from the reception signal. As illustrated in FIG. 1, the transmission channel estimating device 11 includes a known-signal-sequence memory 1 as a known-signal-sequence storage unit for storing a known signal sequence which is a signal sequence known by both of the transmitting end and the receiving end; a transversal filter unit 2 which is a digital filter; a tap-coefficient updating unit 3 for generating updated tap coefficients to replace tap coefficients stored in a tap-coefficient memory 5 with the updated tap coefficients in order to update tap coefficients for the transversal filter unit 2; and a reception-signal memory 4 as a reception-signal storage unit for storing the reception signal, in which the known signal sequence is inserted. The transmission channel estimating device 11 further includes the tap-coefficient memory 5 as a tap-coefficient storage unit for storing tap coefficients updated by the tap-coefficient updating unit 3; a subtracter 6 for calculating a difference between a reception signal and an estimated reception signal; and a tap-section setting unit 7 for designating an effective section formed by a predetermined number of taps out of a plurality of taps in the transversal filter unit.

Figure 2:
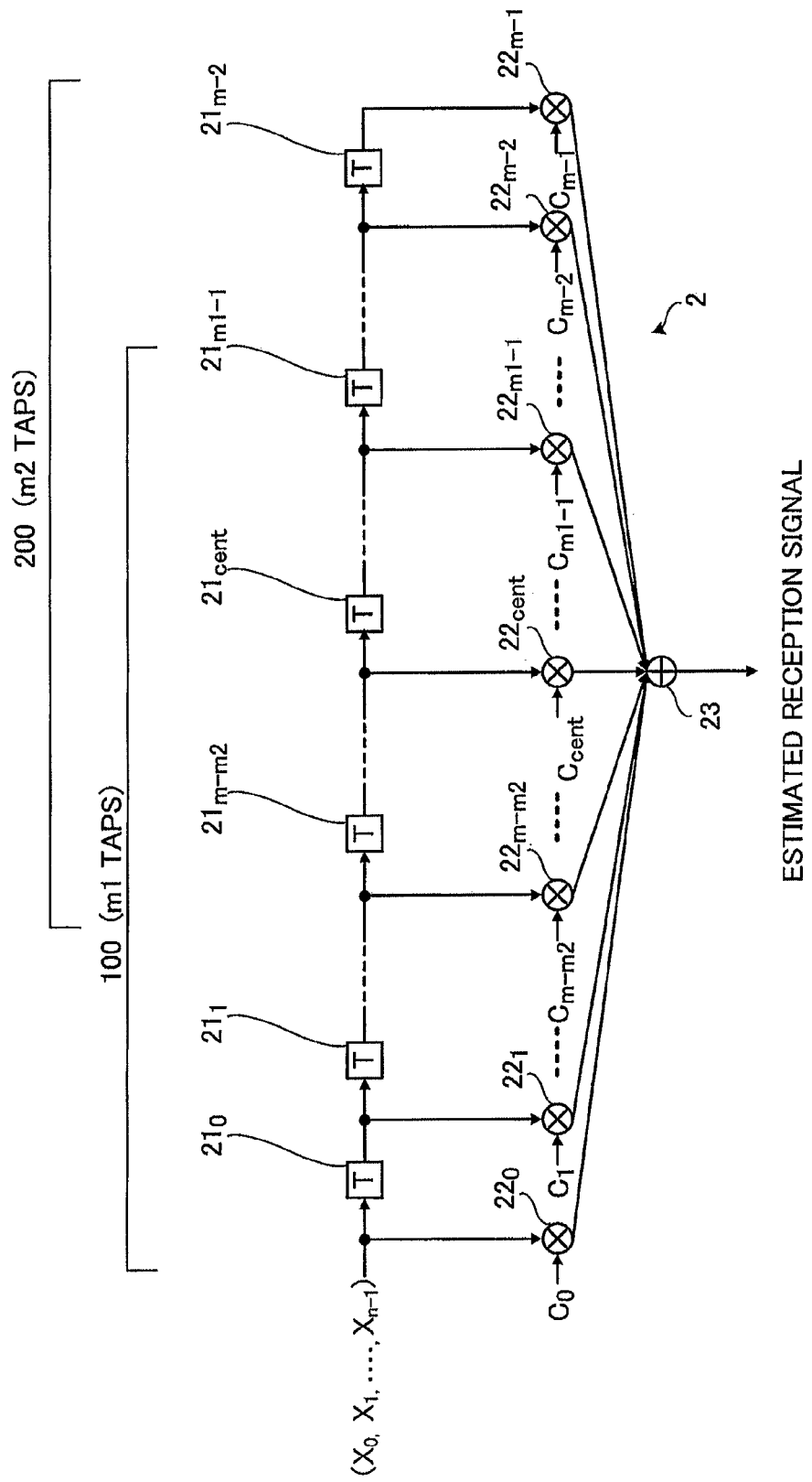
FIG. 2 is a diagram illustrating an example of a configuration of a transversal filter unit illustrated in FIG. 1.

FIG. 2 is a diagram illustrating an example of a configuration of the transversal filter unit 2 illustrated in FIG. 1. As illustrated in FIG. 2, the transversal filter unit 2 includes (m−1) delay elements $21_0$ to $21_{m-2}$, m multipliers $22_0$ to $22_{m-1}$ and an adder 23, where m is an integer indicating a tap length (the number of taps in the transversal filter unit 2). In the drawings, a delay element in a k-th tap (also referred to as 'tap(k)') is denoted as $21_k$ (0≤k≤(m−2)), out of the (m−1) delay elements $21_0$ to $21_{m-2}$. The k-th tap is a tap, tap-number of which is k, and the tap-number is indicated by an integer (subscript number). A delay element multiplier in the tap(k) is denoted as $22_k$ (0≤k≤(m−1)), out of the m multipliers $22_0$ to $22_{m-1}$. A tap coefficient for the tap(k) is denoted as $C_k$ (0≤k≤(m−1)). A tap coefficient for a center tap which is a center of the tap coefficients $C_0$ to $C_{m-1}$ is denoted as $C_{cent}$. A known signal sequence is denoted as $(X_0, X_1, \ldots, X_{n-1})$ and a k-th known signal in the known signal sequence is denoted as $X_k$ (0≤k≤(n−1)), where n is an integer indicating a known signal sequence length.

The tap-section setting unit 7 designates m1 taps including a center tap out of m taps in the transversal filter unit 2, where m1 is an integer which satisfies 1≤m1≤m. A section which includes the designated m1 taps is defined as a first section 100. Although FIG. 2 indicates that a tap(0) to a tap(m1−1) are selected as the taps forming the first section 100, the first section 100 does not necessarily include the tap(0). In the transversal filter unit 2, a tap which is not included in the selected first section 100 enters into an inactive state and the first section 100 in the transversal filter unit 2 is a transversal filter of the m1 taps in appearance. In the tap which is in the inactive state, a multiplier outputs zero.

Figure 3:
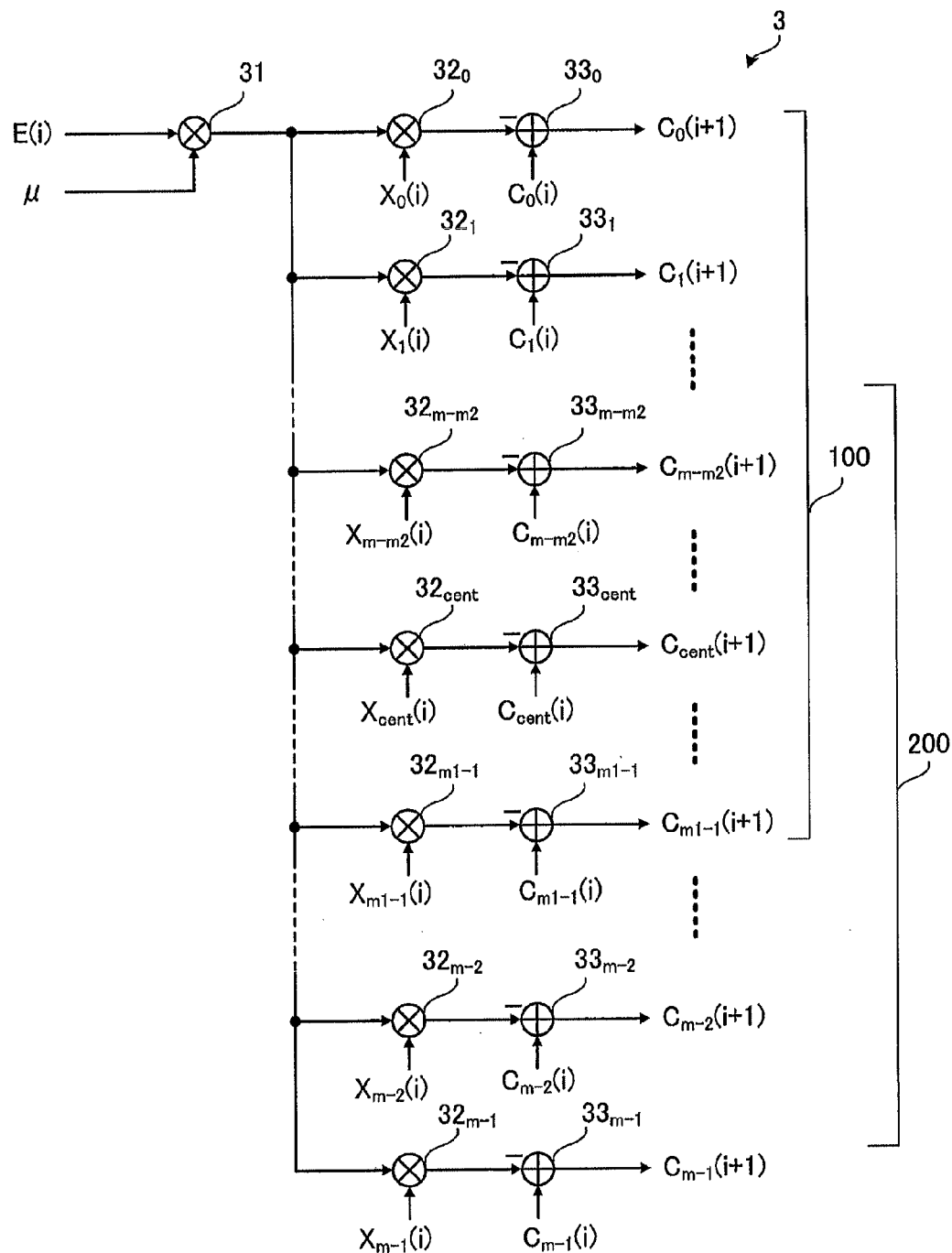
FIG. 3 is a diagram illustrating an example of a configuration of a tap-coefficient updating unit illustrated in FIG. 1.
Figure 4:
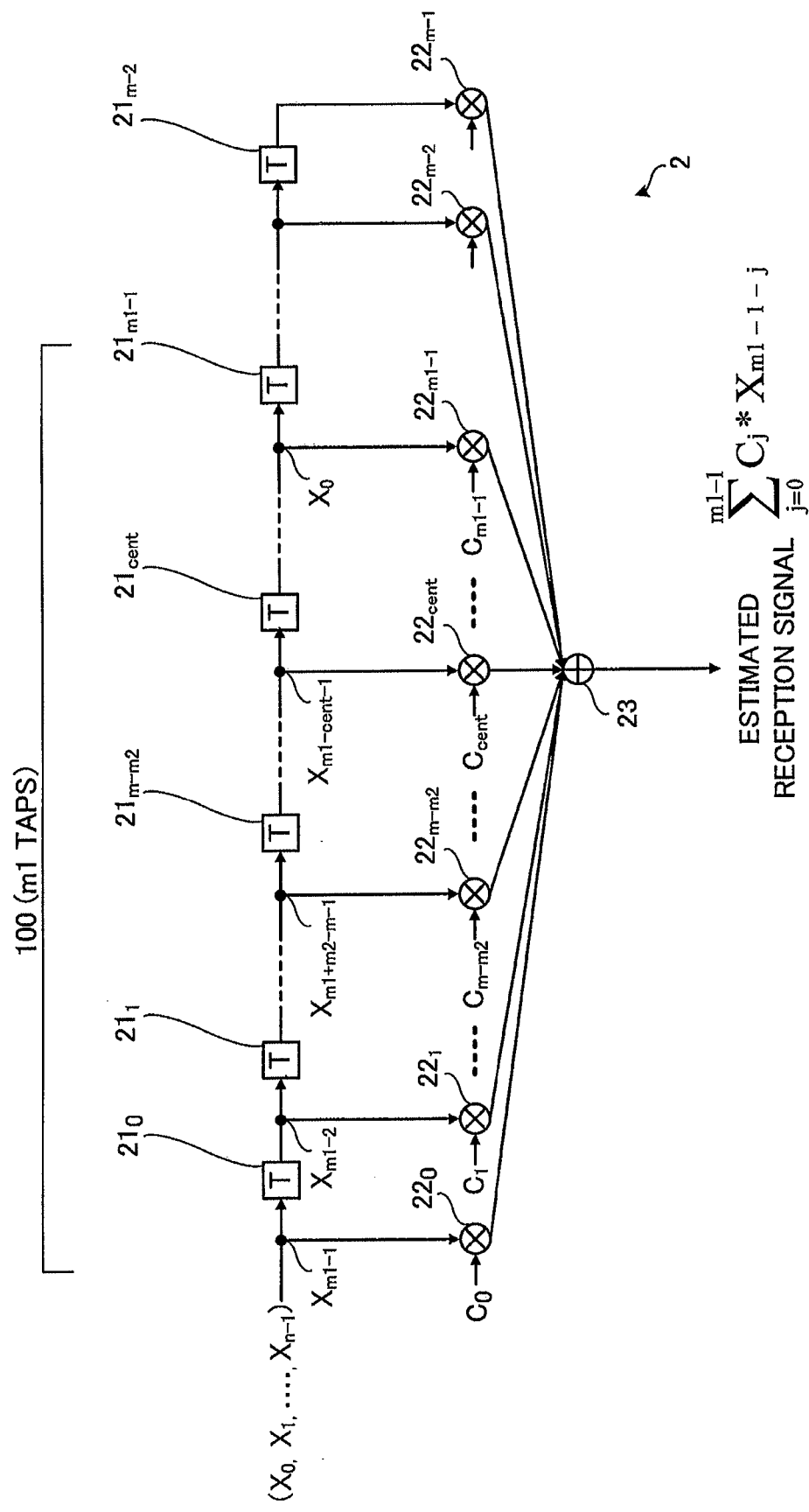
FIG. 4 is a diagram illustrating the first processing by taps of a first section in the transversal filter unit illustrated in FIG. 2.
Figure 5:
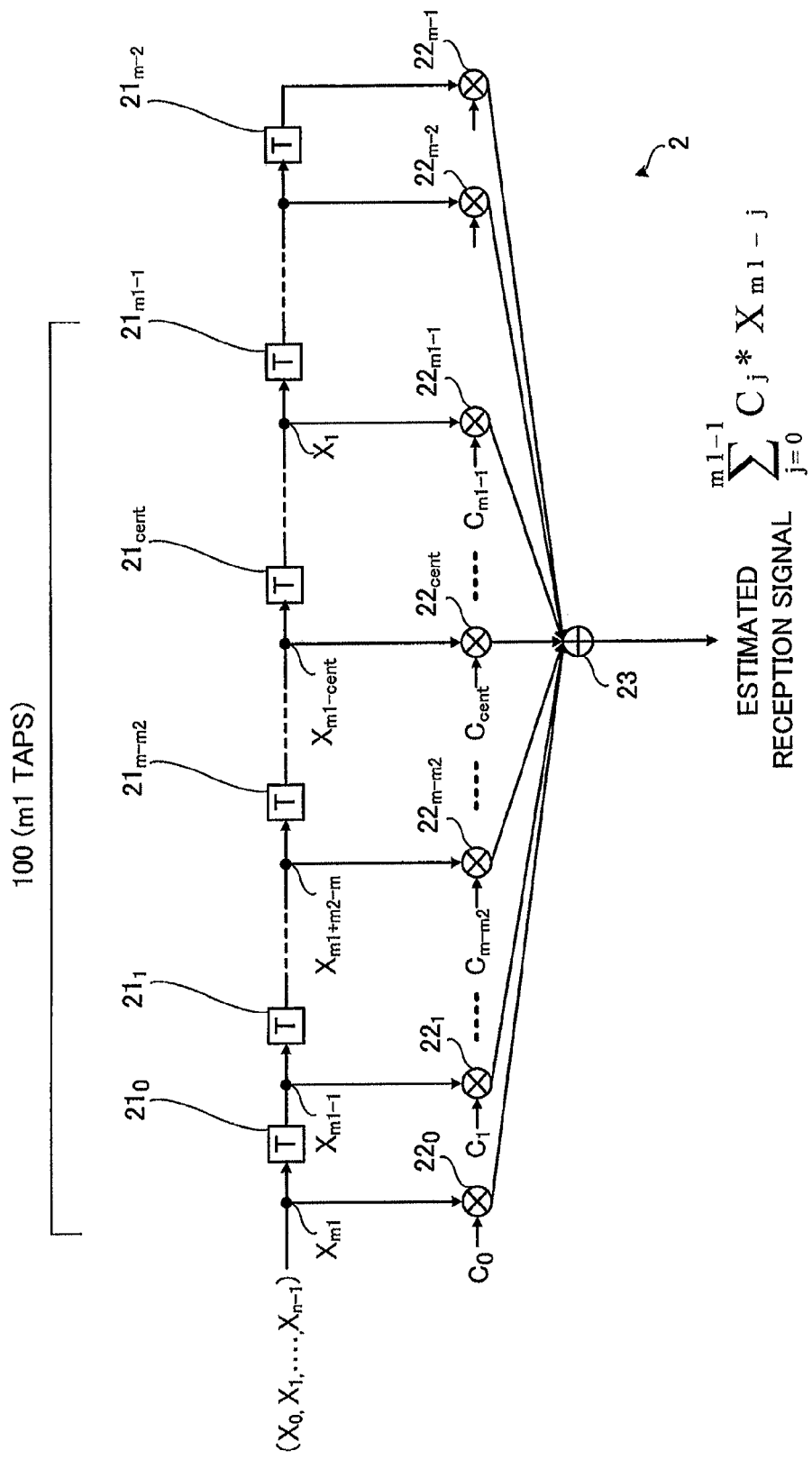
FIG. 5 is a diagram illustrating the second processing by the taps of the first section in the transversal filter unit illustrated in FIG. 2.
Figure 6:
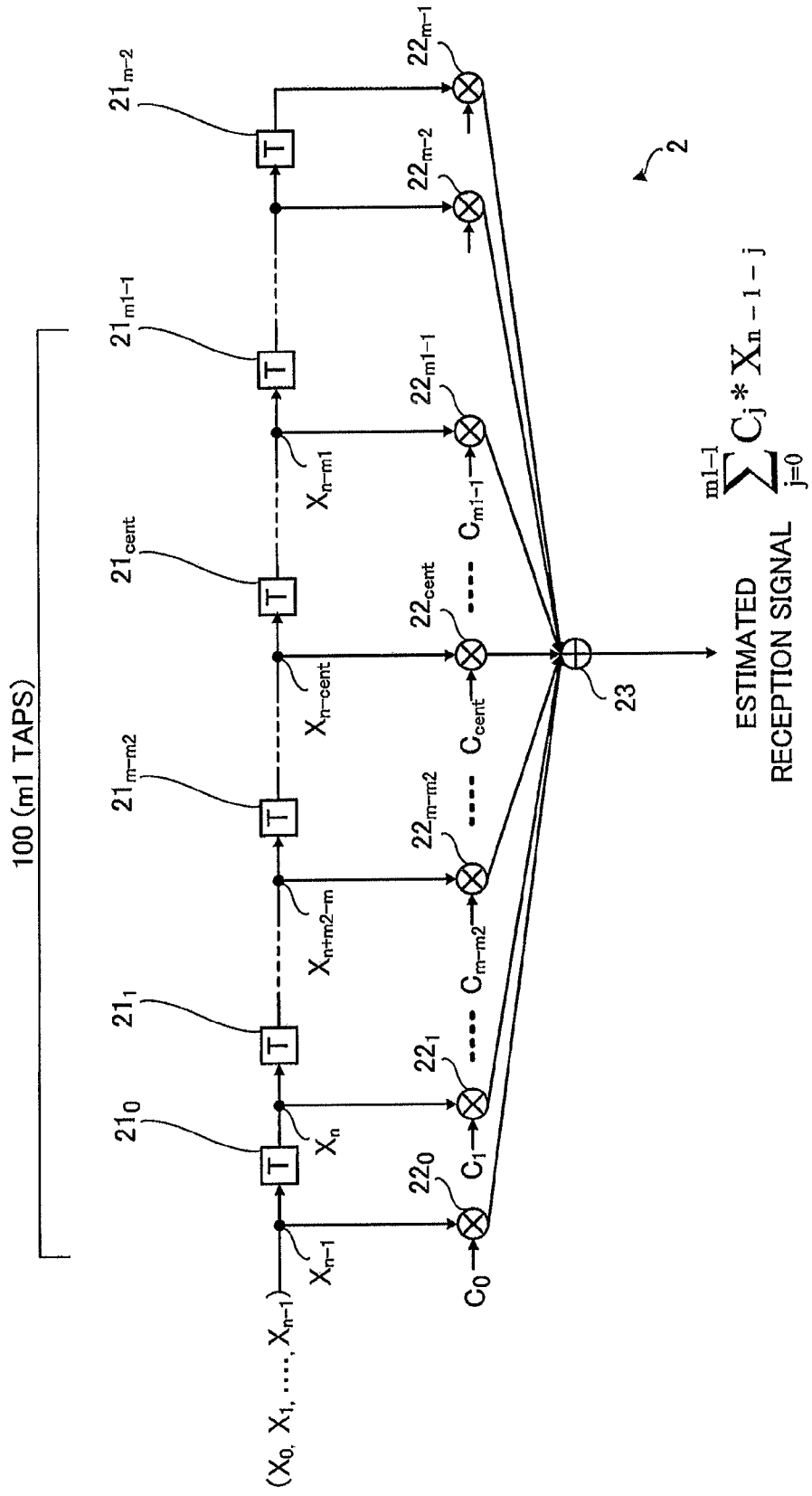
FIG. 6 is a diagram illustrating the (n−m1+1)-th processing by the taps of the first section in the transversal filter unit illustrated in FIG. 2.

FIG. 3 is a diagram illustrating an example of a configuration of the tap-coefficient updating unit 3 using an LMS method. Further, FIGS. 4 to 6 are diagrams illustrating processing by the first section 100 in the transversal filter unit 2. As illustrated in FIG. 4, the transversal filter unit 2 reads out, from the tap-coefficient memory 5, tap coefficients for the taps included in the first section 100 designated by the tap-section setting unit 7. The read m1 tap coefficients are used as tap coefficients $C_0$ to $C_{m1-1}$ respectively to be input to m1 multipliers $22_0$ to $22_{m1-1}$ in the taps included in the first section 100. In parallel with the processing, the transversal filter unit 2 reads out the known signal sequence $(X_0, X_1, \ldots, X_{n-1})$ from the known-signal-sequence memory 1, sets known signals $X_{m1-2}$ to $X_0$ in the known signal sequence to delay elements $21_0$ to $21_{m1-2}$ respectively, and sets a known signal $X_{m1-1}$ as an input to the multiplier $22_0$. At this time, an estimated reception signal $Y_0$ is obtained. The estimated reception signal $Y_0$ as an output from the transversal filter unit 2 is obtained by the following expression (1).

$$\sum_{j=0}^{m1-1} C_j * X_{m1-1-j} \quad (1)$$

The reception-signal memory 4 stores the reception signal which includes the known signal sequence. The reception signal corresponding to the center tap which is read out from the reception-signal memory 4 and the estimated reception signal which is output from the transversal filter unit 2 are input to the subtracter 6, and a difference between them is input to the tap-coefficient updating unit 3 as an error signal. The reception signal corresponding to the center tap means a reception signal corresponding to a known signal $X_{m1-cent-1}$ which is set to a delay element $21_{cent-1}$ and input to a multiplier $22_{cent}$.

Next, referring to FIG. 3, an update of tap coefficients will be explained. Various methods for updating tap coefficients have been proposed. The LMS (Least Mean Square) method is a typical method, in which an updated tap coefficient $C_k(i+1)$ for the k-th tap is calculated according to an operation of the following equation (2).

$$C_k(i+1) = C_k(i) - \mu * E(i) * X_k(i) \quad (2)$$

In the expression, $C_k(i)$ denotes a tap coefficient for the k-th tap at the time of an i-th coefficient update and μ denotes a step size. Further, E(i) denotes an error signal at the time of the i-th tap coefficient update; $X_k(i)$ denotes a known signal corresponding to the k-th tap at the time of the i-th tap coefficient update; and k is an integer indicating the tap-number. It is required to select an appropriate value as the step size μ. If the value is too large, a convergence speed increases and accuracy decreases. If the value is too small, the convergence speed decreases and the accuracy increases. Moreover, the adaptive algorithm used for updating the tap coefficients is not limited to the LMS algorithm and another adaptive algorithm using a step size can be used.

As illustrated in FIG. 3, the tap-coefficient updating unit 3 includes a multiplier 31; m multipliers $32_k$ (0≤k≤(m−1)); and m subtracters $33_k$ (0≤k≤(m−1)). The tap-coefficient updating unit 3 reads out tap coefficients from the tap-coefficient memory 5. The tap-coefficient updating unit 3 performs tap coefficient update operations, according to the equation (2), for only the tap coefficients $C_0$ to $C_{m1-1}$ for the taps included in the first section 100 designated by the tap-section setting unit 7. The tap-coefficient updating unit 3 rewrites updated tap coefficients $C_k(0≤k≤(m1−1))$, i.e., $C_0(i+1)$ to $C_{m1-1}(i+1)$, into the tap-coefficient memory 5. To 'rewrite' is defined as to delete tap coefficients $C_0(i)$ to $C_{m1-1}(i)$ which are obtained at the time of the i-th coefficient update from the tap-coefficient memory 5, and then to write tap coefficients $C_0(i+1)$ to $C_{m1-1}(i+1)$ which are obtained at the time of an (i+1)-th coefficient update into the tap-coefficient memory 5.

Next, as illustrated in FIG. 5, the transversal filter unit 2 reads out the tap coefficients updated by the tap-coefficient updating unit 3 for the taps included in the first section 100 which is designated by the tap-section setting unit 7, from the tap-coefficient memory 5. Then, the transversal filter unit 2 sets them as the tap coefficients $C_0$ to $C_{m1-1}$ to be input to the multipliers $22_0$ to $22_{m1-1}$ in the taps in the first section 100. In parallel with the processing, the transversal filter unit 2 reads out the known signal sequence from the known-signal-sequence memory 1. The transversal filter unit 2 sets known signals $X_{m1-1}$ to $X_1$ in the known signal sequence to the delay elements $21_0$ to $21_{m1-2}$ and sets a known signal $X_{m1}$ as an input to the multiplier $22_0$. At this time, an estimated reception signal $Y_1$ which is given in the following expression (3) is obtained as an output from the transversal filter unit 2.

$$\sum_{j=0}^{m1-1} C_j * X_{m1-j} \tag{3}$$

The tap-coefficient updating unit 3 reads out the tap coefficients from the tap-coefficient memory 5, only for the tap coefficients $C_0$ to $C_{m1-1}$ for the taps included in the first section 100 designated by the tap-section setting unit 7. The tap-coefficient updating unit 3 performs tap coefficient update operations according to the equation (2) to rewrite updated tap coefficients into the tap-coefficient memory 5.

The tap coefficient update operations for the first section 100 are repeated (n−m1+1) times until a last known signal $X_{n-1}$ is input to the multiplier $22_0$ and an estimated reception signal $Y_{n-m1}$ given in the following expression (4) is obtained as illustrated in FIG. 6. The tap coefficient update operations for the first section 100 are thus completed. A series of these operations is defined as an update section for the first section 100.

$$\sum_{j=0}^{m1-1} C_j * X_{n-1-j} \tag{4}$$

Then, the tap-section setting unit 7 designates m2 taps including the center tap out of the m taps in the transversal filter unit 2, where m2 is an integer which satisfies 1≤m2≤m. The m2 taps are defined as a second section 200. Although FIG. 2 indicates that a tap(m−m2) to a tap(m−1) are selected, the second section 200 does not necessarily include the tap (m−1). In the transversal filter unit 2, a tap which is not included in the selected second section 200 enters into an inactive state, and the second section 200 in the transversal filter unit 2 is a transversal filter of the m2 taps in appearance.

Figure 7:
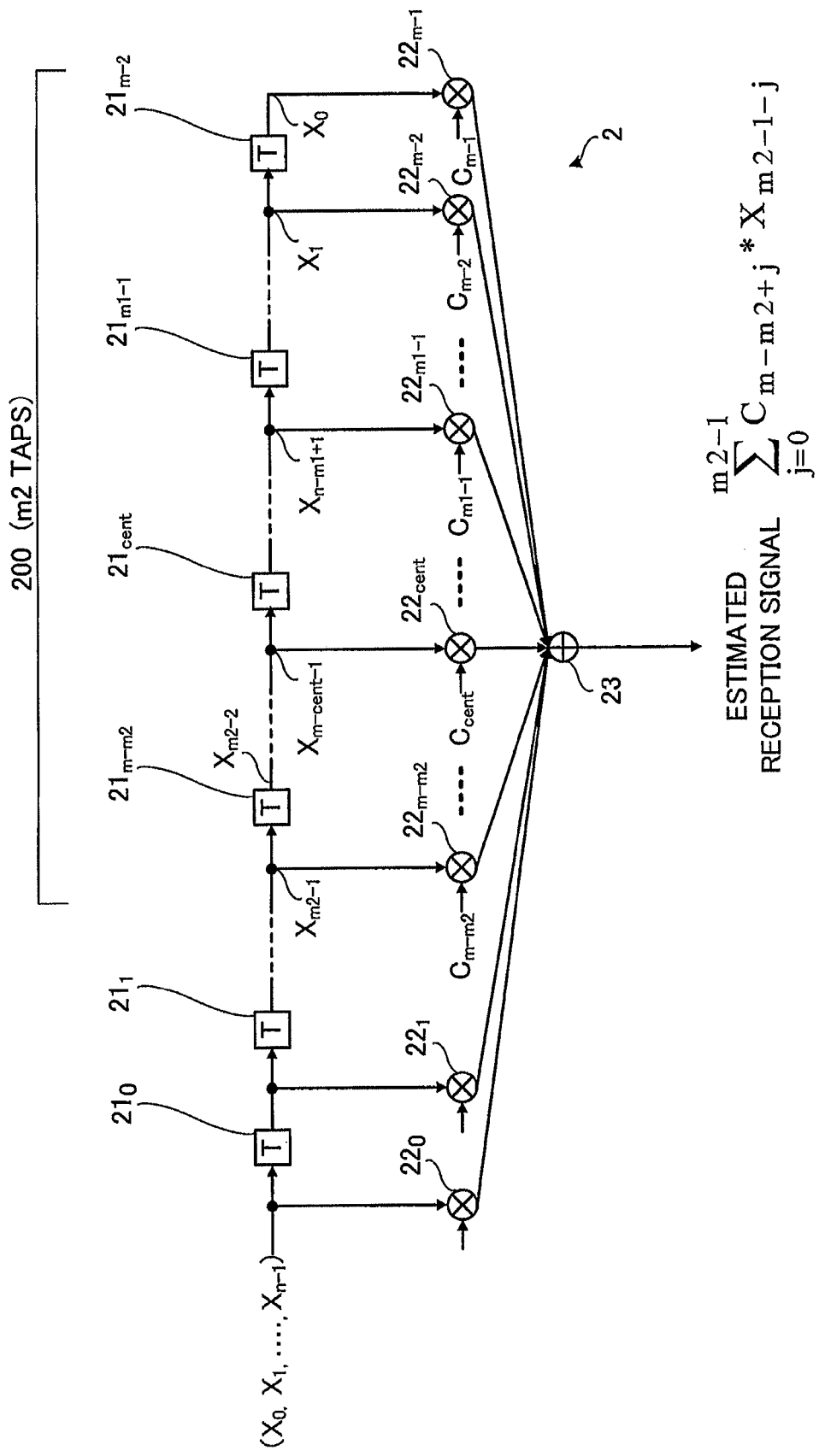
FIG. 7 is a diagram illustrating the first processing by taps of a second section in the transversal filter unit illustrated in FIG. 2.
Figure 8:
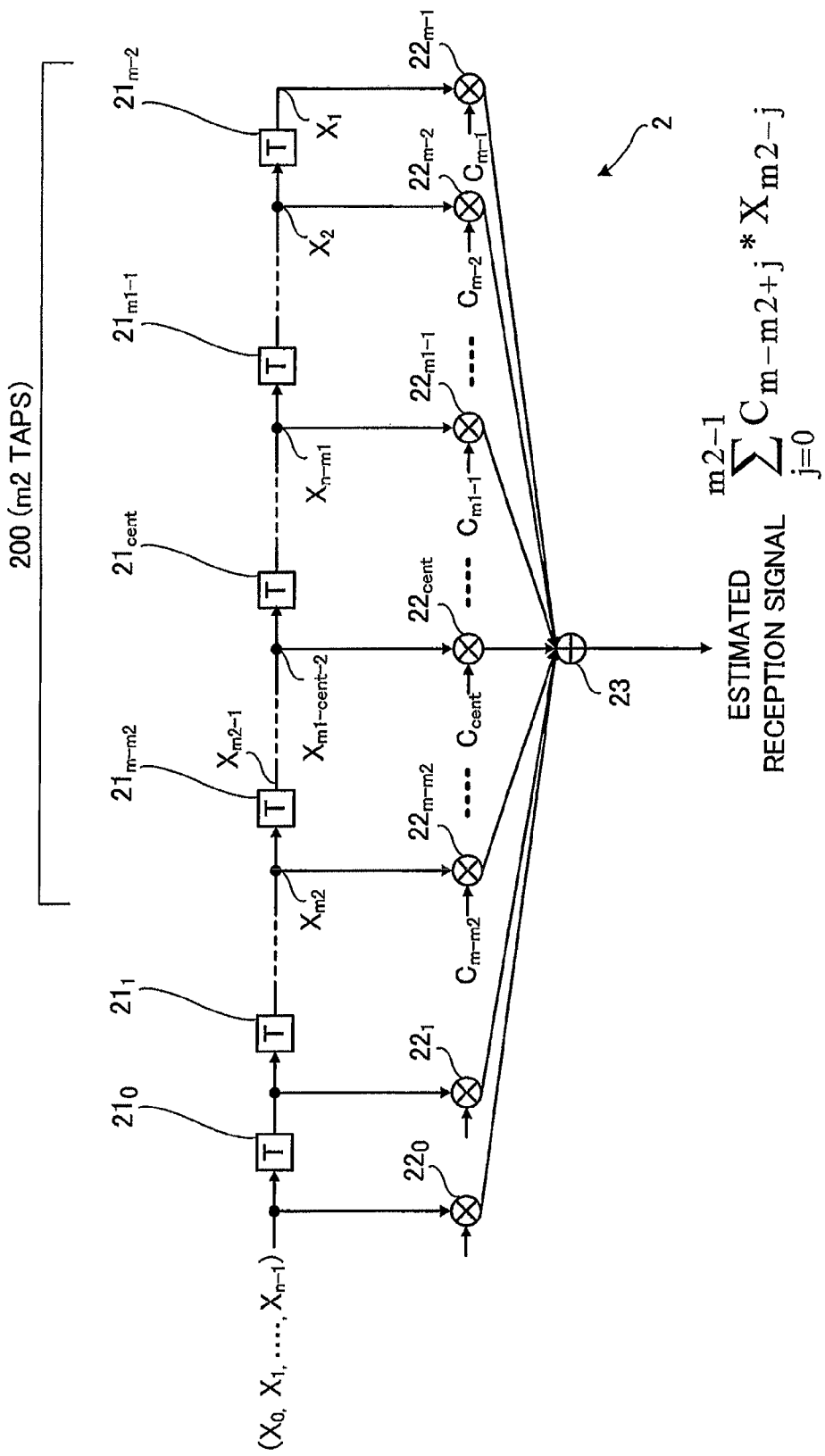
FIG. 8 is a diagram illustrating the second processing by the taps of the second section in the transversal filter unit illustrated in FIG. 2.
Figure 9:
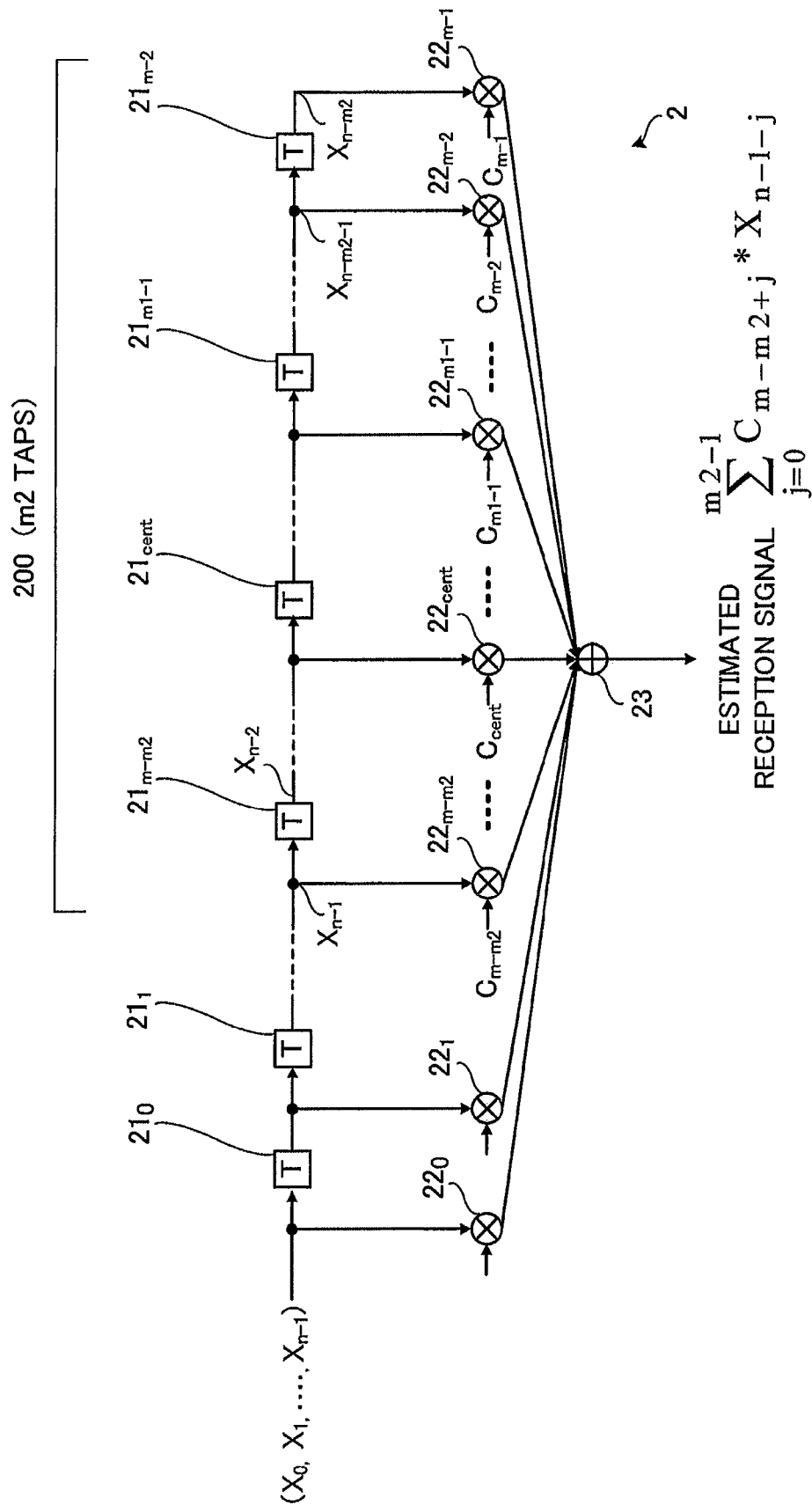
FIG. 9 is a diagram illustrating the (n−m2+1)-th processing by the taps of the second section in the transversal filter unit illustrated in FIG. 2.

FIGS. 7 to 9 are diagrams illustrating processing by the second section 200 in the transversal filter unit 2. As illustrated in FIG. 7, the transversal filter unit 2 reads out tap coefficients for the taps included in the second section 200 which is designated by the tap-section setting unit 7, from the tap-coefficient memory 5. The read m2 tap coefficients are used as tap coefficients $C_{m-m2}$ to $C_{m-1}$ respectively to be input to m2 multipliers $22_{m-m2}$ to $22_{m-1}$ in the taps included in the second section 200. In parallel with the processing, the transversal filter unit 2 reads out the known signal sequence ($X_0$, $X_1$, ..., $X_{n-1}$) from the known-signal-sequence memory 1. The transversal filter unit 2 sets known signals $X_{m2-2}$ to $X_0$ in the known signal sequence to delay elements $21_{m-m2}$ to $21_{m-2}$ respectively and sets a known signal $X_{m2-1}$ as an input to the multiplier $22_{m-m2}$. At this time, an estimated reception signal $Y_0$ as an output from the transversal filter unit 2 is obtained. The estimated reception signal $Y_0$ is given in the following expression (5).

$$\sum_{j=0}^{m2-1} C_{m-m2+j} * X_{m2-1-j} \tag{5}$$

The tap-coefficient updating unit 3 reads out tap coefficients updated by the tap-coefficient updating unit 3 for the taps included in the second section 200 which is designated by the tap-section setting unit 7, from the tap-coefficient memory 5. The tap-coefficient updating unit 3 reads out the tap coefficients from the tap-coefficient memory 5, only for the tap coefficients $C_{m-m2}$ to $C_{m-1}$ to be input to the multipliers $22_{m-m2}$ to $22_{m-1}$ in the taps of the second section 200. The tap-coefficient updating unit 3 performs tap coefficient update operations according to the expression (2) to rewrite updated tap coefficients $C_k$((m−m2)≤k≤(m−1)), i.e., $C_{m-m2}$(i+1) to $C_{m-1}$(i+1), into the tap-coefficient memory 5.

Next, as illustrated in FIG. 8, the transversal filter unit 2 reads out the tap coefficients updated by the tap-coefficient updating unit 3 for the taps included in the second section 200 which is designated by the tap-section setting unit 7, from the tap-coefficient memory 5. Then, the transversal filter unit 2 sets them as the tap coefficients $C_{m-m2}$ to $C_{m-1}$ to be input to the multipliers $22_{m-m2}$ to $22_{m-1}$ in the taps in the second section 200. In parallel with the processing, the transversal filter unit 2 reads out the known signal sequence from the known-signal-sequence memory 1. The transversal filter unit 2 sets known signals $X_{m2-1}$ to $X_1$ in the known signal sequence to the delay elements $21_{m-m2}$ to $21_{m-2}$ and sets a known signal $X_{m2}$ as an input to the multiplier $22_{m-m2}$. At this time, an estimated reception signal $Y_1$ as an output from the transversal filter unit 2 is obtained. The estimated reception signal $Y_1$ is given in the following expression (6).

$$\sum_{j=0}^{m2-1} C_{m-m2+j} * X_{m2-j} \tag{6}$$

The tap-coefficient updating unit 3 reads out tap coefficients from the tap-coefficient memory 5, for only the tap coefficients $C_{m-m2}$ to $C_{m-1}$ for the taps included in the second section 200 which is designated by the tap-section setting unit 7, and then performs tap coefficient update operations according to the expression (2) to rewrite into the tap-coefficient memory 5.

The tap coefficient update operations for the second section 200 are repeated (n−m2+1) times until a last known signal $X_{n-1}$ is input to the multiplier $22_{m-m2}$ and an estimated reception signal $Y_{n-m2}$ given in the following expression (7) is obtained as illustrated in FIG. 9, and thus the tap coefficient updating operations for the second section 200 are completed. A series of these operations is defined as an update section for the second section 200.

$$\sum_{j=0}^{m2-1} C_{m-m2+j} * X_{n-1-j} \tag{7}$$

Subsequently, a set of the tap coefficient update operations for the first section 100 and the tap coefficient update operations for the second section 200 is repeated a plurality of times, and thus a series of the tap coefficient update operations is completed.

In the above explanation, an example where the algorithm for updating the tap coefficients is the LMS method has been described. However, another method such as an RLS (Recursive Least Square) method may be used as the algorithm.

Furthermore, if the reception signal, the known signal sequence and the tap coefficients are represented as complex numbers, calculations such as addition, subtraction and multiplication are all performed using complex numbers.

As described above, the transmission channel estimating device 11 or the transmission channel estimating method according to the first embodiment can reduce the number of taps in appearance by updating the tap coefficients for the first section 100 and the second section 200 which are set so that both of the sections include the center tap. Therefore, even if the known signal sequence length n is not sufficiently longer than the number m of taps to obtain a performance, sufficient update frequency can be obtained and transmission channel estimation can be achieved with higher accuracy.

Moreover, even if the known signal sequence length n is shorter than the number m of taps, the transmission channel estimating device 11 or the transmission channel estimating method according to the first embodiment can perform transmission channel estimation by appropriately selecting the first section 100 and the second section 200 (by selecting the number of taps to be smaller than n in each section).

Furthermore, the transmission channel estimating device 11 or the transmission channel estimating method according to the first embodiment can obtain sufficient update frequency by updating a tap coefficient near the center tap which is important for transmission channel estimation in both of the first section 100 and the second section 200. Therefore, a result of the transmission channel estimation can be obtained with higher accuracy.

Second Embodiment

Figure 10:
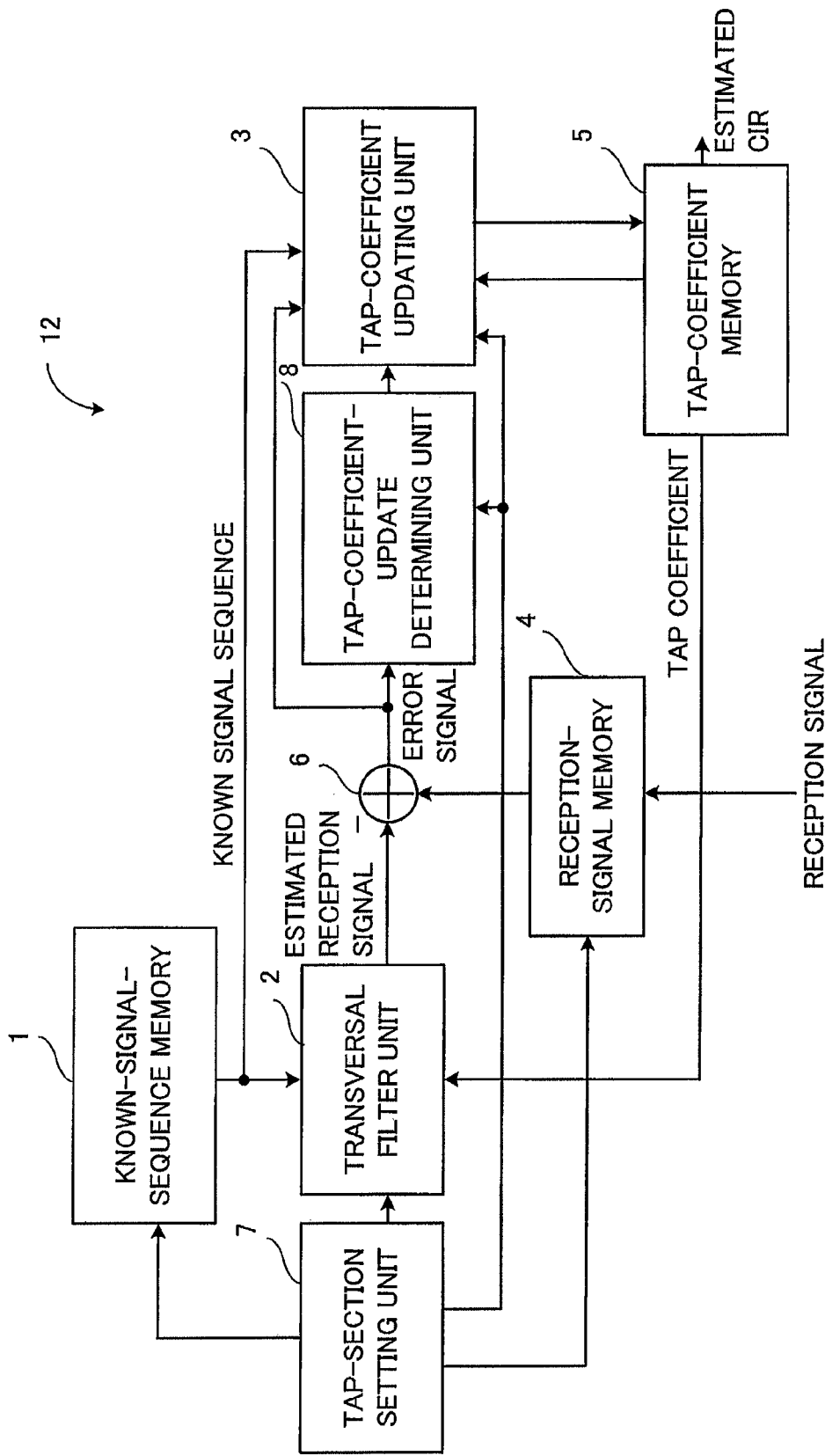
FIG. 10 is a block diagram schematically illustrating a configuration of a transmission channel estimating device according to a second embodiment of the present invention.

FIG. 10 is a block diagram schematically illustrating a configuration of a transmission channel estimating device 12 according to a second embodiment of the present invention (i.e., a device capable of carrying out a transmission channel estimating method according to the second embodiment). Constitutional elements shown in FIG. 10 that are the same as or correspond to those shown in FIG. 1 (the first embodiment) are indicated by the same reference characters. The transmission channel estimating device 12 according to the second embodiment differs from the transmission channel estimating device 11 according to the first embodiment in a point that the transmission channel estimating device 12 includes a tap-coefficient-update determining unit 8.

Next, operations of the transmission channel estimating device 12 according to the second embodiment will be explained. The transmission channel estimating device 12 according to the second embodiment is the same as the transmission channel estimating device 11 according to the first embodiment with regard to a point that the device sets the first section 100 and the second section 200 in the transversal filter unit 2 and performs the tap coefficient update operation in each of the sections. In the transmission channel estimating device 12 according to the second embodiment, the tap-coefficient-update determining unit 8 holds, for each of the update sections in the first section 100 and the second section 200, a sum obtained by adding absolute values of an error signal after a start point of the one update section a predetermined number of times, and a sum obtained by adding absolute values of the error signal immediately before an end point of the one update section a predetermined number of times. By using these values, the tap-coefficient-update determining unit 8 determines whether to update the tap coefficients or not.

Figure 11:
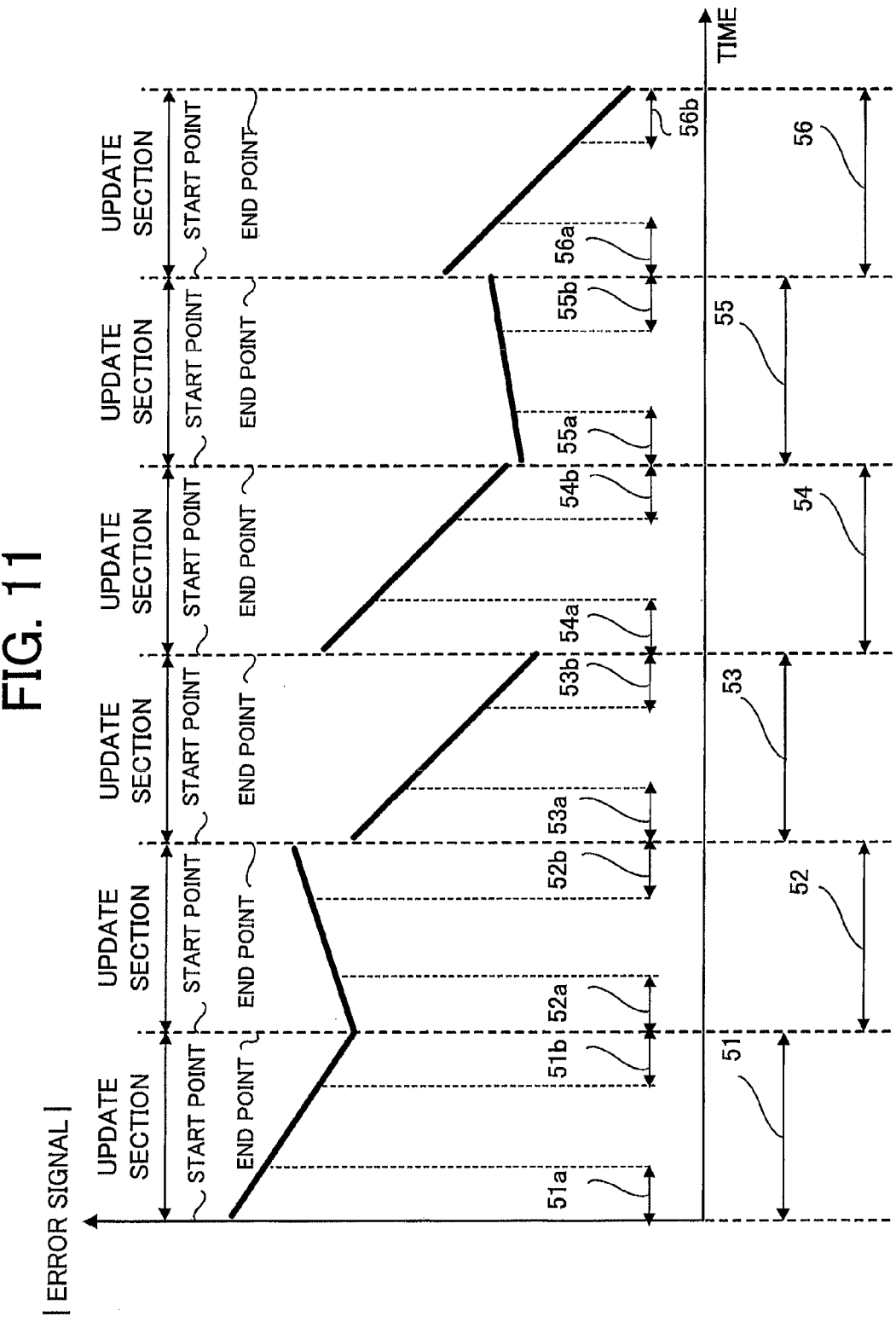
FIG. 11 is a diagram schematically illustrating temporal changes in absolute values of an error signal in the transmission channel estimating device according to the second embodiment.

Details of operations of the tap-coefficient-update determining unit 8 will be explained. FIG. 11 is a diagram schematically illustrating temporal changes in absolute values (|error signal|) of an error signal. In FIG. 11, a horizontal axis represents time and a vertical axis represents the absolute values of the error signal. In FIG. 11, reference numerals 51, 53 and 55 denote transmission channel estimation periods for the first section 100; and reference numerals 52, 54 and 56 denote transmission channel estimation periods for the second section 200. In FIG. 11, each of reference numerals 51a, 51b, 52a, 52b, 53a, 53b, 54a, 54b, 55a, 55b, 56a and 56b denotes an additional period for an addition of absolute values of the error signal. The additional period is a predetermined period. Each of the additional periods is defined as a period used for calculating a sum of absolute values of the error signal within the period by the tap-coefficient-update determining unit 8.

First, when estimation in the transmission channel estimation period 51 for the first section 100 is completed, the tap-coefficient-update determining unit 8 compares a sum of absolute values of the error signal in the additional period 51a and a sum of absolute values of the error signal in the additional period 51b. The tap-coefficient-update determining unit 8 judges that the sum of absolute values in the additional period 51b is smaller than the sum of absolute values in the additional period 51a, as can be understood from FIG. 11. Then, the tap-coefficient-update determining unit 8 determines to update tap coefficients for taps belonging to only the first section 100 (hereinafter referred to as 'taps belonging to a first tap group') and tap coefficients for taps belonging to both of the first section 100 and the second section 200 (hereinafter referred to as 'taps belonging to a common tap group'), and holds the sum of absolute values of the error signal in the additional period 51b as a minimum residual error.

Next, when estimation in the transmission channel estimation period 52 for the second section 200 is completed, the tap-coefficient-update determining unit 8 compares a sum of absolute values of the error signal in the additional period 52a and a sum of absolute values of the error signal in the additional period 52b. As can be understood from FIG. 11, the sum of absolute values in the additional period 52b is larger than the sum of absolute values of the error signal in the additional period 52a. So, the tap-coefficient-update determining unit 8 considers that it diverges and determines not to update tap coefficients for taps belonging to only the second section 200 (hereinafter referred to as 'taps belonging to a second tap group'). Moreover, the tap-coefficient-update determining unit 8 compares the sum of absolute values of the error signal in the additional period 52b and the minimum residual error. As can be understood from FIG. 11, the minimum residual error is smaller than the sum of absolute values of the error signal in the additional period 52b. So, the tapcoefficient-update determining unit 8 determines not to update the tap coefficients belonging to the common tap group.

Next, when estimation in the transmission channel estimation period 53 for the first section 100 is completed, the tap-coefficient-update determining unit 8 compares a sum of absolute values of the error signal in the additional period 53*a* and a sum of absolute values of the error signal in the additional period 53*b*. As can be understood from FIG. 11, the sum of absolute values in the additional period 53*b* is smaller than the sum of absolute values of the error signal in the additional period 53*a*. So, the tap-coefficient-update determining unit 8 determines to update the tap coefficients for the taps belonging to the first tap group. Moreover, the tap-coefficient-update determining unit 8 compares the sum of absolute values of the error signal in the additional period 53*b* and the minimum residual error. As can be understood from FIG. 11, the minimum residual error is larger than the sum of absolute values of the error signal in the additional period 53*b*. So, the tap-coefficient-update determining unit 8 determines to update the tap coefficients for the taps belonging to the common tap group. Moreover, the tap-coefficient-update determining unit 8 updates the minimum residual error to the sum of absolute values of the error signal in the additional period 53*b*.

Next, when estimation in the transmission channel estimation period 54 for the second section 200 is completed, the tap-coefficient-update determining unit 8 compares a sum of absolute values of the error signal in the additional period 54*a* and a sum of absolute values of the error signal in the additional period 54*b*. As can be understood from FIG. 11, the sum of absolute values in the additional period 54*b* is smaller than the sum of absolute values of the error signal in the additional period 54*a*. So, the tap-coefficient-update determining unit 8 determines to update the tap coefficients for the taps belonging to the second tap group. Moreover, the tap-coefficient-update determining unit 8 compares the sum of absolute values of the error signal in the additional period 54*b* and the minimum residual error. As can be understood from FIG. 11, the minimum residual error is smaller than the sum of absolute values of the error signal in the additional period 54*b*. So, the tap-coefficient-update determining unit 8 determines not to update the tap coefficients for the taps belonging to the common tap group.

Next, when estimation in the transmission channel estimation period 55 for the first section 100 is completed, the tap-coefficient-update determining unit 8 compares a sum of absolute values of the error signal in the additional period 55*a* and a sum of absolute values of the error signal in the additional period 55*b*. As can be understood from FIG. 11, the sum of absolute values in the additional period 55*b* is larger than the sum of absolute values of the error signal in the additional period 55*a*. So, the tap-coefficient-update determining unit 8 determines not to update the tap coefficients for the taps belonging to the first tap group. Moreover, the tap-coefficient-update determining unit 8 compares the sum of absolute values of the error signal in the additional period 55*b* and the minimum residual error. As can be understood from FIG. 11, the minimum residual error is smaller than the sum of absolute values of the error signal in the additional period 55*b*. So, the tap-coefficient-update determining unit 8 determines not to update the tap coefficients for the taps belonging to the common tap group.

Next, when estimation in the transmission channel estimation period 56 for the second section 200 is completed, the tap-coefficient-update determining unit 8 compares a sum of absolute values of the error signal in the additional period 56*a* and a sum of absolute values of the error signal in the additional period 56*b*. As can be understood from FIG. 11, the sum of absolute values in the additional period 56*b* is smaller than the sum of absolute values of the error signal in the additional period 56*a*. So, the tap-coefficient-update determining unit 8 determines to update the tap coefficients for the taps belonging to the second tap group. Moreover, the tap-coefficient-update determining unit 8 compares the sum of absolute values of the error signal in the additional period 56*b* and the minimum residual error. As can be understood from FIG. 11, the minimum residual error is larger than the sum of absolute values of the error signal in the additional period 56*b*. So, the tap-coefficient-update determining unit 8 determines to update the tap coefficients for the taps belonging to the common tap group.

The tap-coefficient updating unit 3 updates the tap coefficients according to the expression (2), for the taps which are determined to be updated by the tap-coefficient-update determining unit 8, and does not update the tap coefficients for the taps which are determined not to be updated by the tap-coefficient-update determining unit 8, thereby holding previous values.

Moreover, the tap-coefficient updating unit 3 can control a step size $\mu$ used in the tap-coefficient updating unit 3 by using the sum of absolute values of the error signal. For example, if the sum of absolute values of the error signal in the additional period 53*a* is smaller than a predetermined threshold value, a greater importance may be placed to improving accuracy than increasing a convergence speed in the estimation period 53 by using the step size $\mu$ of a small value.

As described above, the transmission channel estimating device 12 or the transmission channel estimating method according to the second embodiment compares three values: a sum obtained adding absolute values of the error signal a predetermined number of times from a start of an update; a sum obtained by adding absolute values of the error signal a predetermined number of times immediately before an end point; and a minimum residual error, to determine whether to update each of the taps belonging to the first tap group, the taps belonging to the second tap group and the taps belonging to the common tap group or not. Therefore, the transmission channel estimating device 12 or the transmission channel estimating method according to the second embodiment can update tap coefficients only for appropriate taps.

Moreover, since the transmission channel estimating device 12 or the transmission channel estimating method according to the second embodiment controls the step size $\mu$ by using a sum obtained by adding absolute values of the error signal a predetermined number of times, it can achieve transmission channel estimation with higher accuracy.

Third Embodiment

Figure 12:
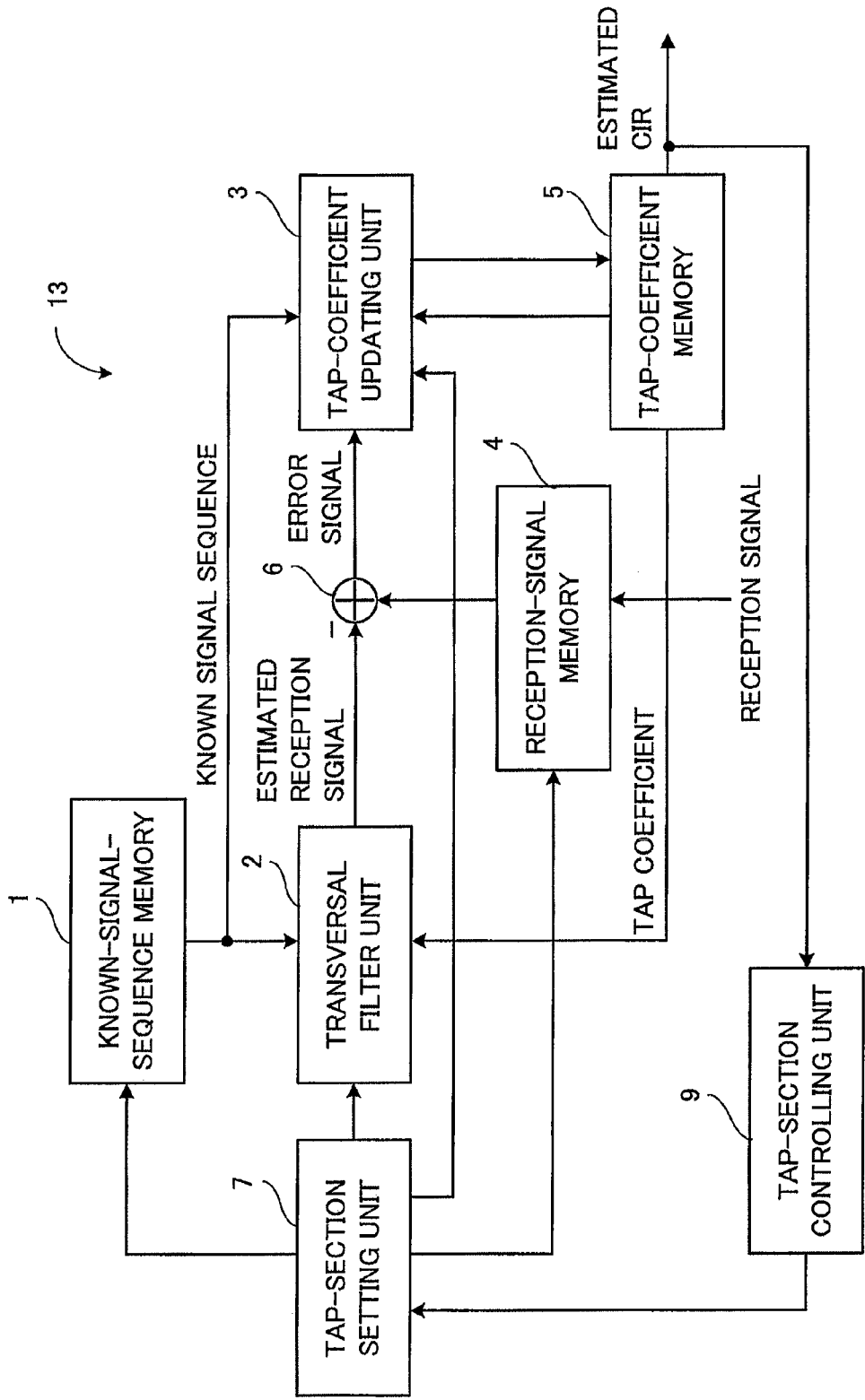
FIG. 12 is a block diagram schematically illustrating a configuration of a transmission channel estimating device according to a third embodiment of the present invention.

FIG. 12 is a block diagram schematically illustrating a configuration of a transmission channel estimating device 13 according to a third embodiment of the present invention (i.e., a device capable of carrying out a transmission channel estimating method according to the third embodiment). Constitutional elements shown in FIG. 12 that are the same as or correspond to those shown in FIG. 1 (the first embodiment) are indicated by the same reference characters. The transmission channel estimating device 13 according to the third embodiment illustrated in FIG. 12 differs from the transmission channel estimating device 11 according to the first embodiment illustrated in FIG. 1 in a point that the transmission channel estimating device 13 includes a tap-section controlling unit 9. Furthermore, the tap-section controlling unit 9 may be provided in the transmission channel estimating device 12 according to the second embodiment illustrated in FIG. 10.

Next, operations of the transmission channel estimating device 13 according to the third embodiment will be explained. The transmission channel estimating device 13 is the same as the transmission channel estimating device 11 according to the first embodiment with regard to a point of the operations of setting the first section 100 and the second section 200 in the transversal filter unit 2 and updating the tap coefficients in each of the sections. In the third embodiment, the tap-section controlling unit 9 dynamically changes the first section 100 and the second section 200 according to tap coefficients stored in the tap-coefficient memory 5, or more specifically, according to a scheme (system) to which a reception signal conforms (e.g., television broadcasting) or a reception status.

Operations of the tap-section controlling unit 9 will be explained below. First, a case where the scheme (system) to which a reception signal conforms is a technology in which the reception signal includes a plurality of known signal sequences of different lengths will be explained. If a known signal sequence length n is sufficiently longer than the number m of taps in the transversal filter unit 2, the tap-section controlling unit 9 sets each of the first section 100 and the second sections 200 as a section which includes all of the number m of taps. If the known signal sequence length n is shorter or not sufficiently longer than the number m of taps, the tap-section controlling unit 9 sets each of the first section 100 and the second section 200 as an appropriate section which includes the center tap.

Next, a case where the first section 100 and the second section 200 are changed according to a reception status will be explained. The tap coefficients stored in the tap-coefficient memory 5 is used as an estimated CIR as it is. The tap-section controlling unit 9 reads out a tap coefficient from the tap-coefficient memory 5 and analyzes a delay profile. If the delay profile spreads, a greater importance is placed on reducing influence of the spread of the delay profile than tap coefficient update frequency, and the tap-section controlling unit 9 sets both of the first section 100 and the second section 200 to be wide. If the delay profile converges near the center tap, the tap-section controlling unit 9 sets both of the first section 100 and the second section 200 to be narrow and increases tap coefficient update frequency near the center tap. Such a control by the tap-section controlling unit 9 can realize transmission channel estimation with high accuracy.

As described above, since the transmission channel estimating device or the transmission channel estimating method according to the third embodiment is configured to dynamically change the first and second sections 100 and 200 according to a scheme (system) to which a reception signal conforms or a reception status, it can optimize a tap coefficient update range or tap coefficient update frequency according to a change in the scheme (system) to which the reception signal conforms or in the reception status and can achieve transmission channel estimation with higher accuracy.

Fourth Embodiment

Figure 13:
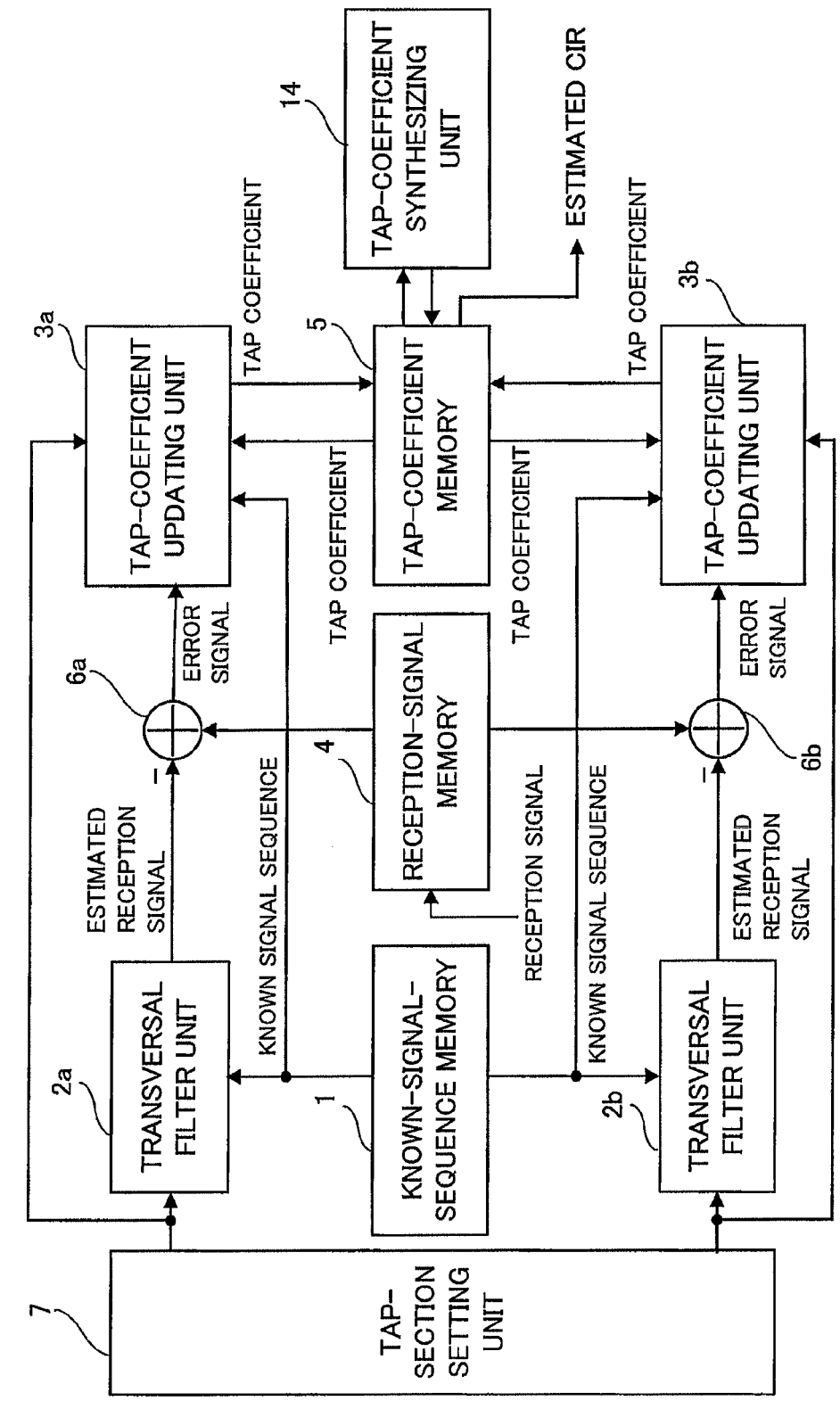
FIG. 13 is a block diagram schematically illustrating a configuration of a transmission channel estimating device according to a fourth embodiment of the present invention.

FIG. 13 is a block diagram schematically illustrating a configuration of a transmission channel estimating device 16 according to a fourth embodiment of the present invention (i.e., a device capable of carrying out a transmission channel estimating method according to the fourth embodiment). Constitutional elements shown in FIG. 13 that are the same as or correspond to those shown in FIG. 1 (the first embodiment) are indicated by the same reference characters. The transmission channel estimating device 16 according to the fourth embodiment illustrated in FIG. 13 differs from the transmission channel estimating device 11 according to the first embodiment illustrated in FIG. 1 in a point that the transmission channel estimating device 16 includes a tap-coefficient synthesizing unit 14 and includes transversal filter units (first and second transversal filter units) 2a and 2b, subtracters (first and second subtracters) 6a and 6b, and tap-coefficient updating units (first and second tap-coefficient updating units) 3a and 3b.

Next, operations of the transmission channel estimating device 16 according to the fourth embodiment will be explained. In the first embodiment, a transmission channel is estimated by repeating a series of the operations including updating the tap coefficients for the first section 100 and then updating the tap coefficients for the second section 200 by using the transversal filter unit 2, the subtracter 6 and the tap-coefficient updating unit 3. The transmission channel estimating device 16 sets the first section 100 in the transversal filter unit 2a, sets the second section 200 in the transversal filter unit 2b. The transmission channel estimating device 16 updates tap coefficients for taps belonging to the first tap group, by using the transversal filter unit 2a, the subtracter 6a and the tap-coefficient updating unit 3a (hereinafter these elements are referred to as 'system-a' or 'first-system'). In parallel with the processing, the transmission channel estimating device 16 updates tap coefficients for taps belonging to the second tap group, by using the transversal filter unit 2b, the subtracter 6b and the tap-coefficient updating unit 3b (hereinafter these elements are referred to as 'system-b' or 'second-system'). Configurations of the transversal filter units 2a and 2b, the subtracters 6a and 6b, and the tap-coefficient updating units 3a and 3b in the fourth embodiment are the same as those of the transversal filter unit 2, the subtracter 6, and the tap-coefficient updating unit 3 in the first embodiment respectively. The tap coefficient update operations and methods of setting the first section 100 and the second section 200 in these two systems are the same as those described in the first embodiment respectively.

After a series of the tap coefficient update operations in these two systems are completed, the tap-coefficient synthesizing unit 14 reads out, from the tap-coefficient memory 5, updated tap coefficients for common taps belonging to the common tap group which are updated by using the system-a and updated tap coefficients for the common taps belonging to the common tap group which are updated by using the system-b. The tap-coefficient synthesizing unit 14 synthesizes the tap coefficients according to a ratio between sums of their powers to rewrite them into the tap-coefficient memory 5. For example, the tap-coefficient synthesizing unit 14 obtains $(Pa \times Ca(m) + Pb \times Cb(m))/(Pa+Pb)$ where Pa is a sum of powers of the common taps belonging to the common tap group updated by using the system-a; Ca(m) is an m-th tap coefficient; Pb is a sum of powers of the common taps belonging to the common tap group updated by using the system-b; and Cb(m) is an m-th tap coefficient, and rewrites it into the tap-coefficient memory 5 as the m-th tap coefficient for the common tap belonging to the common tap group.

As described above, the transmission channel estimating device 16 or the transmission channel estimating method according to the fourth embodiment updates the tap coefficients by using the system-a and the system-b in parallel. Therefore, the transmission channel estimating device 16 or the transmission channel estimating method according to the fourth embodiment can reduce a processing time or can increase the number of repetition of a series of the tap coefficient update operations within the same processing time of period.

Fifth Embodiment

Figure 14:
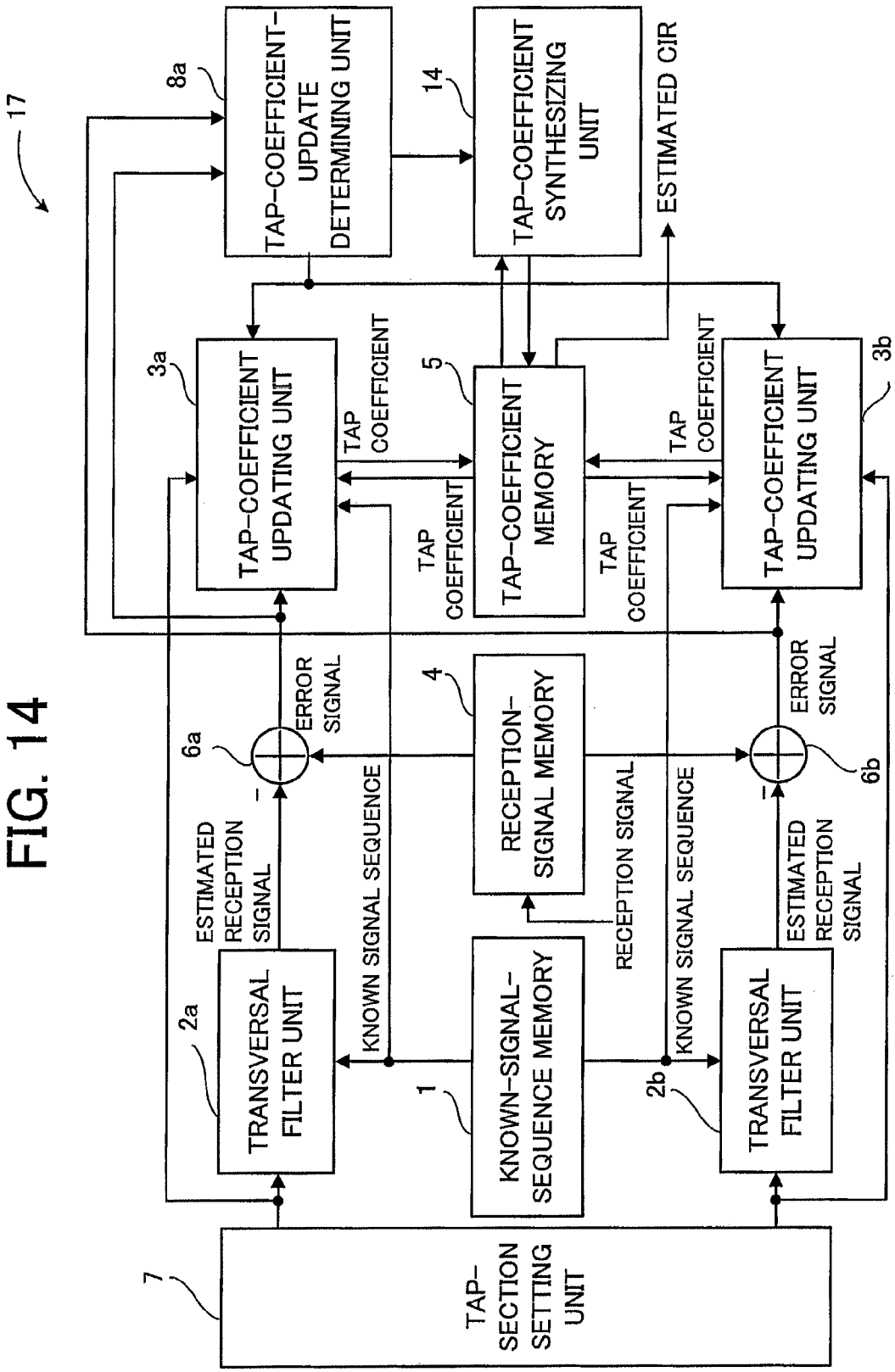
FIG. 14 is a block diagram schematically illustrating a configuration of a transmission channel estimating device according to a fifth embodiment of the present invention.

FIG. 14 is a block diagram schematically illustrating a configuration of a transmission channel estimating device 17 according to a fifth embodiment (i.e., a device capable of carrying out a transmission channel estimating method according to the fifth embodiment). Constitutional elements shown in FIG. 14 that are the same as or correspond to those shown in FIG. 13 (the fourth embodiment) are indicated by the same reference characters. The transmission channel estimating device 17 according to the fifth embodiment illustrated in FIG. 14 differs from the transmission channel estimating device 16 according to the fourth embodiment illustrated in FIG. 13 in a point that the transmission channel estimating device 17 includes a tap-coefficient-update determining unit 8a.

Next, operations of the transmission channel estimating device 17 according to the fifth embodiment will be explained. The transmission channel estimating device 17 is the same as the transmission channel estimating device 16 according to the fourth embodiment with regard to a point that the device sets the first section 100 in the transversal filter unit 2a, sets the second section 200 in the transversal filter unit 2b, and performs updates of the tap coefficients in the two systems in parallel. In the fifth embodiment, the tap-coefficient-update determining unit 8a holds, for each of update sections in the system-a and the system-b, a sum obtained by adding absolute values of an error signal a predetermined number of times from a start point of one update section and a sum obtained by adding absolute values of the error signal a predetermined number of times immediately before an end point of the one update section. By using these values, the tap-coefficient-update determining unit 8a determines whether to update the tap coefficients or not. The tap-coefficient-update determining unit 8a outputs to the tap-coefficient synthesizing unit 14, a minimum value of the sums of absolute values of the error signal in each of the system-a and the system-b which are held at an end point of the update, as a minimum residual error.

The tap-coefficient synthesizing unit 14 reads out, from the tap-coefficient memory 5, updated tap coefficients for the taps belonging to the common tap group which are updated by using the system-a and updated tap coefficients for the taps belonging to the common tap group which are updated by using the system-b. The tap-coefficient synthesizing unit 14 synthesizes the tap coefficients according to a ratio between the minimum residual errors in the system-a and the system-b which are input from the tap-coefficient-update determining unit 8a to rewrite them into the tap-coefficient memory 5.

Figure 15:
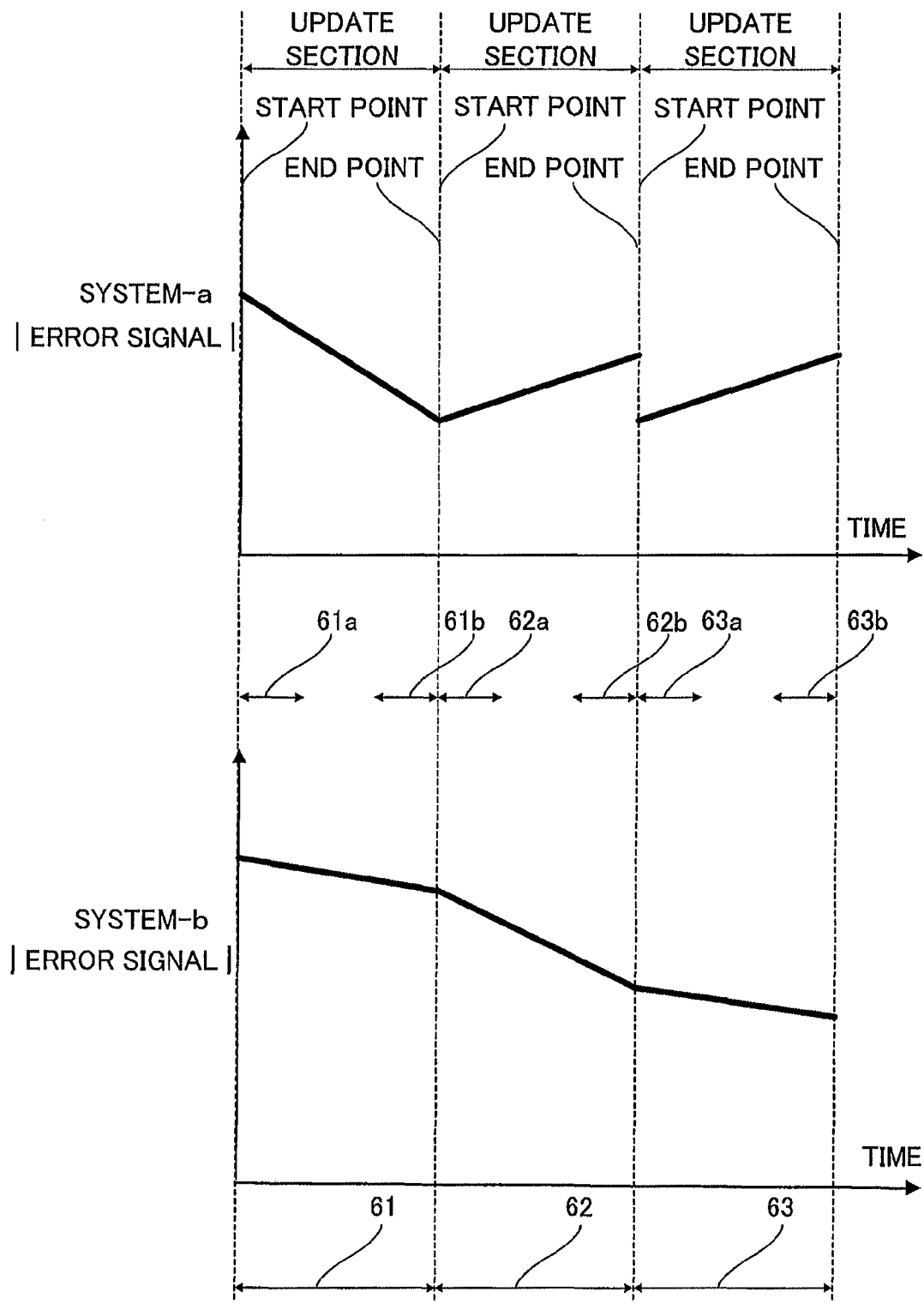
FIG. 15 is a diagram schematically illustrating temporal changes in absolute values of an error signal in a transmission channel estimating device according to the fifth embodiment.

Details of operations of the tap-coefficient-update determining unit 8a and the tap-coefficient synthesizing unit 14 will be explained below. FIG. 15 is a diagram schematically illustrating temporal changes in the absolute values (|error signal|) of the error signals in the system-a and the system-b. In FIG. 15, a horizontal axis represents time and a vertical axis represents the absolute values of the error signals. In FIG. 15, reference numerals 61, 62 and 63 denote transmission channel estimation periods. In FIG. 15, each of reference numerals 61a, 61b, 62a, 62b, 63a and 63b denotes an additional period for adding the absolute values of the error signals, and denotes is a predetermined period. Each of the additional periods is a period which is used by the tap-coefficient-update determining unit 8a for calculating a sum of the absolute values of the error signal during the period. FIG. 15 illustrates the transmission channel estimation periods 61, 62 and 63 in the system-a and the system-b of a same length, for the sake of simplicity. However, in some cases, according to setting of the first section 100 and the second section 200, a difference occurs between the transmission channel estimation period in the system-a and the transmission channel estimation period in the system-b.

First, when the estimation in the transmission channel estimation period 61 is completed, the tap-coefficient-update determining unit 8a compares a sum of absolute values of the error signal in the additional period 61a and a sum of absolute values of the error signal in the additional period 61b, for each of the system-a and the system-b. The tap-coefficient-update determining unit 8a judges that the sum of the absolute values in the additional period 61b is smaller than the sum of the absolute values of the error signal in the additional period 61a in both of the system-a and the system-b, as can be understood from FIG. 15. The tap-coefficient-update determining unit 8a determines to update tap coefficients for taps belonging to the first section 100 for the system-a, and to update tap coefficients for taps belonging to the second section 200 for the system-b, and holds the sum of the absolute values of the error signal in the additional period 61b as a minimum residual error.

Next, when the estimation in the transmission channel estimation period 62 is completed, the tap-coefficient-update determining unit 8a compares a sum of absolute values of the error signal in the additional period 62a and a sum of absolute values of the error signal in the additional period 62b, for each of the system-a and the system-b. As can be understood from FIG. 15, in the system-a, the sum of the absolute values in the additional period 62b is larger than the sum of the absolute values of the error signal in the additional period 62a. So, the tap-coefficient-update determining unit 8a judges that it diverges in the system-a, and determines not to update the tap coefficients for the taps belonging to the first section 100 for the system-a. Moreover, the tap-coefficient-update determining unit 8a keeps holding the sum of the absolute values of the error signal in the additional period 61b as the minimum residual error. The tap-coefficient-update determining unit 8a judges that the sum of the absolute values in the additional period 62b is smaller than the sum of the absolute values in the additional period 62a in the system-b. So, the tap-coefficient-update determining unit 8a determines to update the tap coefficients for the taps belonging to the second section 200 for the system-b, and holds the sum of absolute values of the error signal in the additional period 62b as the minimum residual error.

Next, when the estimation in the transmission channel estimation period 63 is completed, the tap-coefficient-update determining unit 8a compares a sum of absolute values of the error signal in the additional period 63a and a sum of absolute values of the error signal in the additional period 63b, for each of the system-a and the system-b. As can be understood from FIG. 15, the sum of the absolute values in the additional period 63b is larger than the sum of the absolute values of the error signal in the additional period 63a. So, the tap-coefficient-update determining unit 8a judges that it diverges in the system-a, determines not to update the tap coefficients for the taps belonging to the first section 100 for the system-a, and keeps holding the sum of the absolute values of the error signal in the additional period 61b as the minimum residual error. The tap-coefficient-update determining unit 8a judges that the sum of the absolute values in the additional period 63b is smaller than the sum of the absolute values of the error signal in the additional period 63a in the system-b, determines to update the tap coefficients for the taps belonging to the second section 200 for the system-b, and holds the sum of the absolute values of the error signal in the additional period 63b as the minimum residual error.

If no update of the tap coefficients is performed in all of the update sections, the sum of the absolute values of the error signal in the additional period 61a is held as the minimum residual error.

When the estimation in the transmission channel estimation period 63 is completed, the minimum residual errors held in the system-a and the system-b are the sum of the absolute values of the error signal in the additional period 61b (hereinafter referred to as |Ea|) and the sum of the absolute values of the error signal in the additional period 63b (hereinafter referred to as |Eb|) respectively. The tap-coefficient-update determining unit 8a outputs the two minimum residual errors |Ea| and |Eb| to the tap-coefficient synthesizing unit 14.

The tap-coefficient synthesizing unit 14 synthesizes the tap coefficients according to a ratio between the minimum residual errors |Ea| and |Eb| input from the tap-coefficient-update determining unit 8a to rewrite them into the tap-coefficient memory 5. For example, the tap-coefficient synthesizing unit 14 obtains, $$(|Eb| \times Ca(m) + |Ea| \times Cb(m))/(|Ea| + |Eb|)$$

as an m-th tap coefficient for the tap belonging to the common tap group, where Ca(m) is an updated m-th tap coefficient for the tap belonging to the common tap group which is updated by using the system-a; and Cb(m) is an updated m-th tap coefficient for the tap belonging to the common tap group which is updated by using the system-b, and rewrites it into the tap-coefficient memory 5.

As described above, since the transmission channel estimating device 17 or the transmission channel estimating method according to the fifth embodiment updates the tap coefficients by using the system-a and the system-b in parallel and determines a synthesis ratio of the tap coefficients for the taps belonging to the common tap group by using the minimum residual errors in the system-a and the system-b, it can achieve transmission channel estimation with higher accuracy.

Sixth Embodiment

Figure 16:
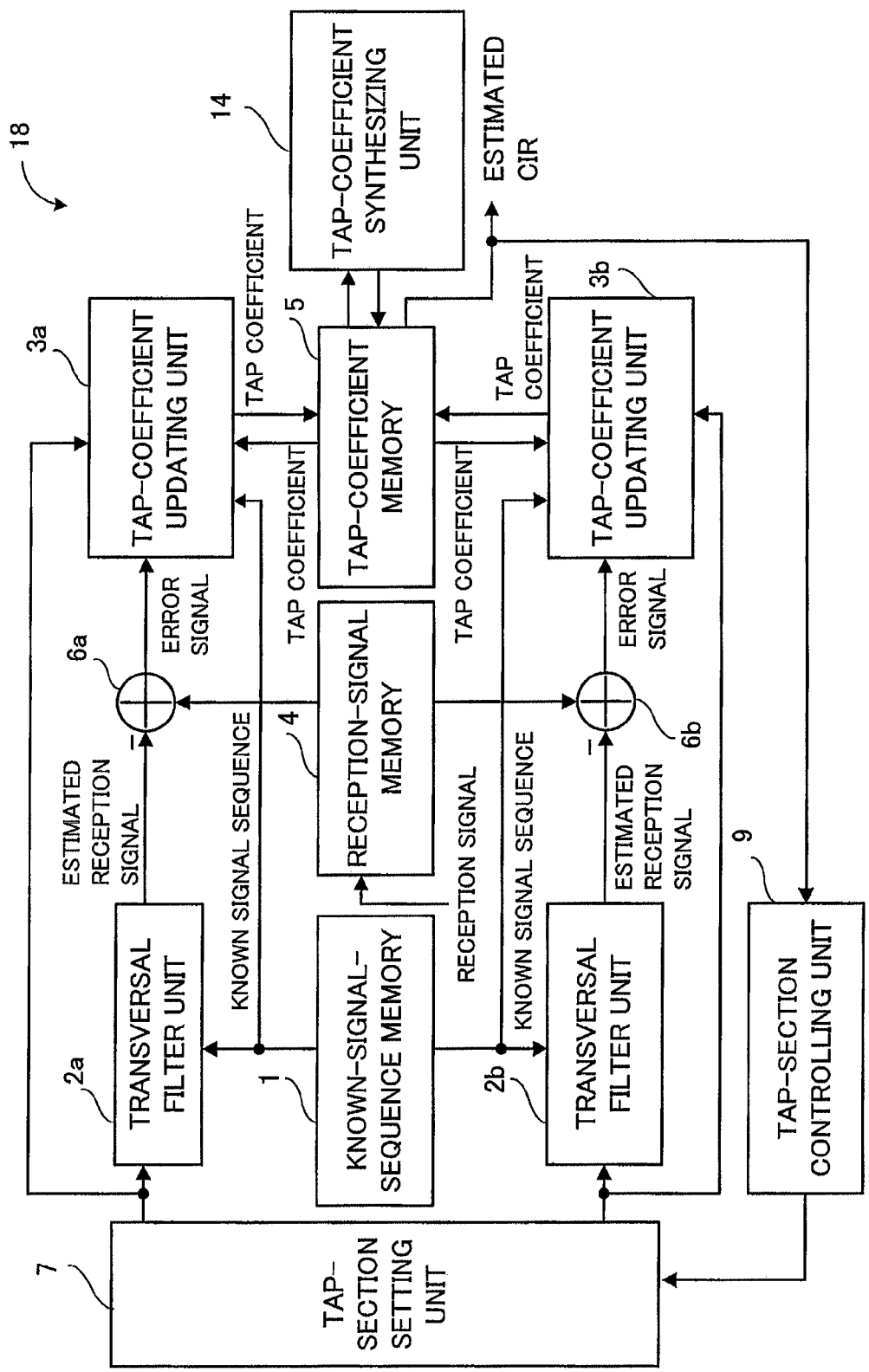
FIG. 16 is a block diagram schematically illustrating a configuration of a transmission channel estimating device according to a sixth embodiment of the present invention.

FIG. 16 is a block diagram schematically illustrating a configuration of a transmission channel estimating device 18 according to a sixth embodiment of the present invention (i.e., a device capable of carrying out a transmission channel estimating method according to the sixth embodiment). Constitutional elements shown in FIG. 16 that are the same as or correspond to those shown in FIG. 13 (the fourth embodiment) are indicated by the same reference characters. The transmission channel estimating device 18 according to the sixth embodiment illustrated in FIG. 16 differs from the transmission channel estimating device 16 according to the fourth embodiment illustrated in FIG. 13 in a point that the transmission channel estimating device 18 includes the tap-section controlling unit 9. Moreover, the tap-section controlling unit 9 may be provided in the transmission channel estimating device 17 according to the fifth embodiment illustrated in FIG. 14.

Next, operations of the transmission channel estimating device 18 according to the sixth embodiment will be explained. The transmission channel estimating device 18 is the same as the transmission channel estimating device 16 according to the fourth embodiment with regard to a point that the device sets the first section 100 in the transversal filter unit 2a, sets the second section 200 in the transversal filter unit 2b and performs updates of the tap coefficients in the two systems in parallel. In the sixth embodiment, the tap-section controlling unit 9 dynamically changes the first section 100 and the second section 200 according to tap coefficients stored in the tap-coefficient memory 5, or more specifically, according to a scheme (system) to which a reception signal conforms (e.g., television broadcasting) or a reception status.

Operations of the tap-section controlling unit 9 are the same as those explained in the third embodiment.

As described above, since the transmission channel estimating device 18 and the transmission channel estimating method according to the sixth embodiment are configured to dynamically change the first and second sections 100 and 200 according to a scheme (system) to which a reception signal conforms or a reception status, it can optimize a tap coefficient update range or update frequency according to a change in the scheme (system) to which the reception signal conforms or in the additional period status and can achieve transmission channel estimation with higher accuracy.

Seventh Embodiment

Figure 17:
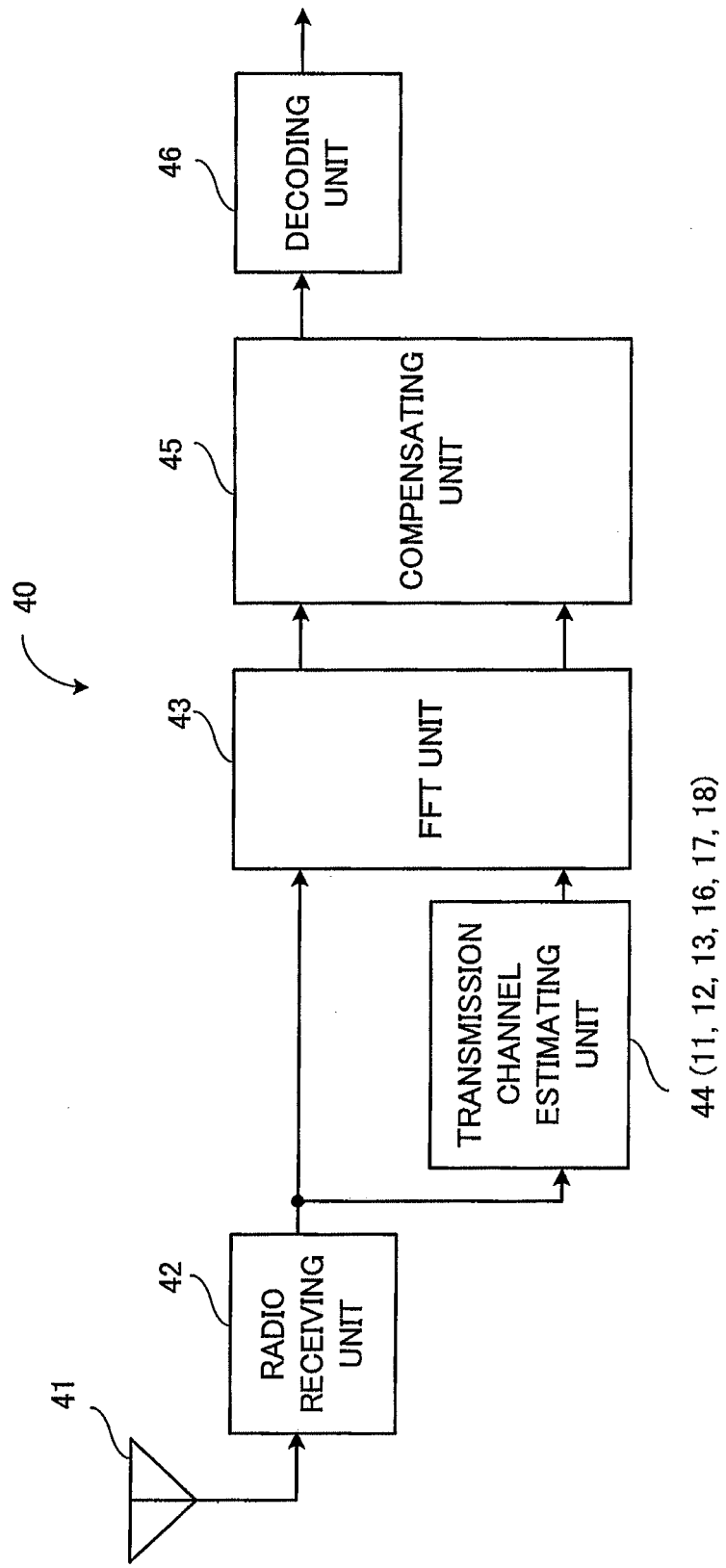
FIG. 17 is a block diagram schematically illustrating a configuration of a receiving apparatus according to a seventh embodiment of the present invention.

FIG. 17 is a block diagram schematically illustrating a configuration of a receiving apparatus 40 according to a seventh embodiment of the present invention. As illustrated in FIG. 17, in the receiving apparatus 40, a signal is received at a radio receiving unit 42 connected to an antenna 41. The signal received at the radio receiving unit 42 is input to an FFT (Fast Fourier Transform) unit 43 and a transmission channel estimating unit 44. The transmission channel estimating unit 44 performs transmission channel estimation by using a pilot signal. Any of the transmission channel estimating devices 11, 12 and 13 in the first, second, third embodiments is used as the transmission channel estimating unit 44. A result of the transmission channel estimation is supplied to the FFT unit 43. The FFT unit 43 performs a fast Fourier transform on input signals. The FFT unit 43 supplies a fast Fourier-transformed reception signal and a result of the fast Fourier-transformed transmission channel estimation are input to a compensating unit 45. The compensating unit 45 compensates the fast Fourier-transformed reception signal on the basis of the result of the fast Fourier-transformed transmission channel estimation. The signal compensated on the basis of the result of the transmission channel estimation is input to a decoding unit 46. The decoding unit 46 decodes the input signal. The data decoded at the decoding unit 46 is used as received data.

Since the receiving apparatus 40 according to the seventh embodiment can compensate a reception signal on the basis of the result of the transmission channel estimation with high accuracy which is obtained by any of the transmission channel estimating devices 11, 12, 13, 16, 17 and 18 according to the first, second, third, fourth, fifth and sixth embodiments, it can improve quality of the received data.

Modifications of First, Second, Third, Fourth, Fifth and Sixth Embodiments

The above-described first, second, third, fourth, fifth and sixth embodiments are examples of the present invention, and various embodiments other than the above-described ones can be implemented. For example, it is possible to realize all of or part of functions of the transmission channel estimating devices according to the embodiments of the present invention by a control circuit including a microprocessor such as a CPU, a ROM (Read Only Memory), a RAM (Random Access Memory) and input/output interfaces, or by using a software program executable in a computer for control.

REFERENCE CHARACTERS 1 known-signal-sequence memory; 2, 2$a$, 2$b$ transversal filter unit; 3, 3$a$, 3$b$ tap-coefficient updating unit; 4 reception-signal memory; 5 tap-coefficient memory; 6, 6$a$, 6$b$ subtracter; 7 tap-section setting unit; 8, 8$a$ tap-coefficient-update determining unit; 9 tap-section controlling unit; 11, 12, 13, 16, 17, 18 transmission channel estimating device; 14 tap-coefficient synthesizing unit; $21_0$ to $21_{m-2}$ delay element (T); $21_{cent}$ delay element (T) in center tap; $22_0$ to $22_{m-1}$ multiplier; $22_{cent}$ multiplier in center tap; 23 adder; 31 multiplier; $32_0$ to $32_{m-1}$ multiplier; $33_0$ to $33_{m-1}$ subtracter; 40 receiving apparatus; 44 transmission channel estimating unit; 45 compensating unit; 51, 53, 55 transmission channel estimation period for first section; 52, 54, 56 transmission channel estimation period for second section; 51$a$, 51$b$, 53$a$, 53$b$, 55$a$, 55$b$ additional period for addition of absolute value of error signal in first section; 52$a$, 52$b$, 54$a$, 54$b$, 56$a$, 56$b$ additional period for addition of absolute value of error signal in second section; 61, 62, 63 transmission channel estimation period; 61$a$, 61$b$, 62$a$, 62$b$, 63$a$, 63$b$ additional period for addition of absolute value of error signal; $C_0$ to $C_{m-1}$ tap coefficient; $C_{cent}$ tap coefficient for center tap; $(X_0, X_1, \ldots, X_{n-1})$ known signal sequence.

What is claimed is:

1. A transmission channel estimating device for estimating a transmission channel from a reception signal in which a known signal sequence is inserted and transmission data is digitally modulated, the transmission channel estimating device comprising:
   a reception-signal storage unit for storing the reception signal;
   a known-signal-sequence storage unit for storing a known signal sequence which is the same as the known signal sequence inserted in the reception signal;
   a tap-coefficient storage unit for storing tap coefficients;
   a transversal filter unit including a plurality of taps, the transversal filter unit generating an estimated reception signal on the basis of the known signal sequence stored in the known-signal-sequence storage unit and the tap coefficients;
   a subtracting unit for generating an error signal on the basis of a difference between the reception signal and the estimated reception signal;
   a tap-coefficient updating unit for generating updated tap coefficients on the basis of the known signal sequence, the tap coefficients and the error signal to replace the tap coefficients stored in the tap-coefficient storage unit with the updated tap coefficients; and
   a tap-section setting unit for designating effective sections formed by a predetermined number of taps out of the plurality of taps in the transversal filter unit, wherein:
   the tap-section setting unit designates a first section which is set so as to include a center tap and a second section which is set so as to include the center tap, as the effective sections in the plurality of taps in the transversal filter unit, and
   the generation of the estimated reception signal by the transversal filter unit, the generation of the updated tap coefficients and the replacement in the tap-coefficient storage unit by the tap-coefficient updating unit are performed by
   generating an estimated reception signal and generating and rewriting updated tap coefficients in the tap-coefficient storage unit for the first section, and generating an estimated reception signal and generating and rewriting updated tap coefficients in the tap-coefficient storage unit for the second section.

2. The transmission channel estimating device according to claim 1, further comprising a tap-coefficient-update determining unit for determining whether to update tap coefficients or not on the basis of the error signal, wherein:
   the tap-coefficient-update determining unit holds a sum obtained by adding absolute values of the error signal in a predetermined number of times of update processing from a start point of one update section which includes a plurality of number of times of update processing, a sum obtained by adding absolute values of the error signal in a predetermined number of times of update processing immediately before an end point of the one update section, and a minimum value out of the sums of absolute values of the error signal in a predetermined number of times of update processing obtained until an update end point of the one update section;
   the tap-coefficient-update determining unit determines, by using the three held values, whether to update the tap coefficients stored in the tap-coefficient storage unit or not, for each of a tap belonging to only the first section, a tap belonging to only the second section, and a tap belonging to both of the first and the second sections; and
   the tap-coefficient updating unit updates the tap coefficients stored in the tap-coefficient storage unit for taps in a section which are determined to be updated by the tap-coefficient-update determining unit.

3. The transmission channel estimating device according to claim 2, wherein:
   the tap-coefficient storage unit
   updates the tap coefficients by using an adaptive algorithm that uses a step size, and
   reduces the step size when the sum of the absolute values of the error signal is smaller than a predetermined threshold value.

4. The transmission channel estimating device according to claim 1, further comprising a tap-section controlling unit for dynamically changing the effective sections of the taps,
   wherein the tap-section controlling unit controls the tap-section setting unit to change the effective sections according to the updated tap coefficients stored in the tap-coefficient storage unit.

5. The transmission channel estimating device according to claim 4, wherein the dynamic change of the effective sections by the tap-section controlling unit is performed according to at least one of a scheme to which the reception signal conforms and a reception status of the reception signal.

6. The transmission channel estimating device according to claim 1, wherein:
   the transversal filter unit is a first-system transversal filter unit including a plurality of taps, the first-system transversal filter unit generating a first-system estimated reception signal on the basis of the known signal sequence stored in the known-signal-sequence storage unit and the tap coefficients;
   the subtracting unit is a first-system subtracting unit for generating a first-system error signal on the basis of a difference between the reception signal and the first-system estimated reception signal; and
   the tap-coefficient updating unit is a first-system tap-coefficient updating unit for generating updated tap coefficients on the basis of the known signal sequence, the tap coefficients and the first-system error signal to replace the tap coefficients stored in the tap-coefficient storage unit with the updated tap coefficients;

the transmission channel estimating device further comprising:

a second-system transversal filter unit including a plurality of taps, the second-system transversal filter unit generating a second-system estimated reception signal on the basis of the known signal sequence stored in the known-signal-sequence storage unit and the tap coefficients stored in the tap-coefficient storage unit;

a second-system subtracting unit for generating a second-system error signal on the basis of a difference between the reception signal and the second-system estimated reception signal; and a second-system tap-coefficient updating unit for generating updated tap coefficients on the basis of the known signal sequence, the tap coefficients and the second-system error signal to replace the tap coefficients stored in the tap-coefficient storage unit with the updated tap coefficients.

7. The transmission channel estimating device according to claim 6, further comprising a tap-coefficient synthesizing unit, wherein:

the tap-section setting unit designates a first section as the effective section out of the plurality of taps in one of the first-system transversal filter unit and the second-system transversal filter unit so that the first section is set to include the center tap, designates a second section as the effective section out of the plurality of taps in the other of the first-system transversal filter unit and the second-system transversal filter unit so that the second section is set to include the center tap, causes the first-system transversal filter unit to generate the first-system estimated reception signal for one of the first and the second sections which is set in the first-system transversal filter unit, and causes the first-system tap-coefficient updating unit to generate the updated tap coefficients to be rewritten in the tap-coefficient storage unit, and in parallel, causes the second-system transversal filter unit to generate the second-system estimated reception signal for the other of the first and the second sections which is set in the second-system transversal filter unit, and causes the second-system tap-coefficient updating unit to generate the updated tap coefficients to be rewritten in the tap-coefficient storage unit; and the tap-coefficient synthesizing unit calculates a ratio between a sum of powers of tap coefficients, which are updated for the first section, for common taps belonging to both of the first and the second sections, and a sum of powers of tap coefficients, which are updated for the second section, for the common tap belonging to both of the first and the second sections, and synthesizes the tap coefficients, which are updated for the first section, for the common tap belonging to both of the first and the second sections and the tap coefficients, which are updated for the second section, for the common tap belonging to both of the first and the second sections, according to the ratio between the sums of powers, thereby generating tap coefficients for the common tap to be rewritten in the tap-coefficient storage unit.

8. The transmission channel estimating device according to claim 6, further comprising a tap-coefficient-update determining unit for determining whether to update tap coefficients or not on the basis of the first-system error signal and the second-system error signal, wherein:

the tap-coefficient-update determining unit holds, for each of the first section and the second section, a first value which is a sum obtained by adding absolute values of the error signal in a predetermined number of times of update processing from a start point of one update section which includes a plurality of number of times of update processing, and a second value which is a sum obtained by adding absolute values of the error signal in a predetermined number of times of update processing immediately before an end point of the one update section, determines whether to update tap coefficients stored in the tap-coefficient storage unit or not by using the first value and the second value, for each of a tap belonging to the first section and a tap belonging to the second section, and holds, for each of the first section and the second section, a minimum value out of the sums of absolute values of the error signal in a predetermined number of times of update processing obtained until an update end point of the one update section; and the tap-coefficient synthesizing unit calculates a ratio between the two minimum values for the first section and the second section, and synthesizes the tap coefficients, which are updated for the first section, for the common tap belonging to both of the first and the second sections and the tap coefficients, which are updated for the second section, for the common tap belonging to both of the first and the second sections, according to the ratio between the minimum values, thereby generating tap coefficients for the common tap to be rewritten in the tap-coefficient storage unit.

9. The transmission channel estimating device according to claim 1, wherein a number of taps in the first section and a number of taps in the second section are smaller than a length of the known signal sequence.

10. A receiving apparatus comprising:

a receiving unit for receiving a signal;

a transmission channel estimating unit for estimating a transmission channel for the signal received by the receiving unit; and a compensating unit for compensating the signal received by the receiving unit according to a result of the estimation by the transmission channel estimating unit, wherein the transmission channel estimating unit is the transmission channel estimating device according to claim 1.

11. A method for estimating a transmission channel which is carried out by a transmission channel estimating device including a known-signal-sequence storage unit for storing a known signal sequence which is the same as a known signal sequence inserted in a reception signal, a transversal filter unit including a plurality of taps, and a tap-coefficient storage unit for storing tap coefficients, the method for estimating a transmission channel from a reception signal in which a known signal sequence is inserted and transmission data is digitally modulated, the method comprising the steps of:

storing the reception signal in a reception-signal storage unit;

generating an estimated reception signal on the basis of the known signal sequence stored in the known-signal-sequence storage unit and tap coefficients stored in the tap-coefficient storage unit;

generating an error signal on the basis of a difference between the reception signal and the estimated reception signal;

generating updated tap coefficients on the basis of the known signal sequence, the tap coefficients and the error signal to replace the tap coefficients stored in the tap-coefficient storage unit with the updated tap coefficients; and designating effective sections formed by a predetermined number of taps out of the plurality of taps in the transversal filter unit, wherein:

a first section set so as to include a center tap and a second section set so as to include the center tap are designated, as the effective sections in the plurality of taps in the transversal filter unit, and the generation of the estimated reception signal in the step of generating the estimated reception signal, and the generation of the updated tap coefficients in the step of generating the updated tap coefficients to replace the tap coefficients stored in the tap-coefficient storage unit with the updated tap coefficients are performed by generating an estimated reception signal and generating and rewriting updated tap coefficients in the tap-coefficient storage unit for the first section, and generating an estimated reception signal and generating and rewriting updated tap coefficients in the tap-coefficient storage unit for the second section.

12. The method according to claim 11, further comprising a step of determining whether to update tap coefficients or not on the basis of the error signal, wherein the determining step includes the steps of:

holding a sum obtained by adding absolute values of the error signal in a predetermined number of times of update processing from a start point of one update section which includes a plurality of number of times of update processing, a sum obtained by adding absolute values of the error signal in a predetermined number of times of update processing immediately before an end point of the one update section, and a minimum value out of the sums of absolute values of the error signal in a predetermined number of times of update processing obtained until an update end point of the one update section;

determining, by using the three held values, whether to update tap coefficients stored in the tap-coefficient storage unit or not, for each of a tap belonging to only the first section, a tap belonging to only the second section and a tap belonging to both of the first and the second sections; and the step of generating the updated tap coefficients to replace the tap coefficients stored in the tap-coefficient storage unit with the updated tap coefficients is performed for taps in a section which are determined to be updated in the determining step.

13. The method according to claim 12, wherein:

the tap coefficients are updated by using an adaptive algorithm that uses a step size, and the step size is reduced when the sum of the absolute values of the error signal is smaller than a predetermined threshold value.

14. The method according to claim 11, further comprising a step of dynamically changing the effective sections of the taps, wherein in the step of dynamically changing, the effective sections are changed according to the updated tap coefficients stored in the tap-coefficient storage unit.

15. The method according to claim 14, wherein dynamically changing of the effective sections is performed according to at least one of a scheme to which the reception signal conforms and a reception status of the reception signal.

16. The method according to claim 11, wherein:

the transmission channel estimating device comprising:

a first-system transversal filter unit including a plurality of taps, the first-system transversal filter unit generating a first-system estimated reception signal on the basis of the known signal sequence stored in the known-signal-sequence storage unit and the tap coefficients;

a first-system subtracting unit for generating a first-system error signal on the basis of a difference between the reception signal and the first-system estimated reception signal;

a first-system tap-coefficient updating unit for generating updated tap coefficients on the basis of the known signal sequence, the tap coefficients and the first-system error signal to replace the tap coefficients stored in the tap-coefficient storage unit with the updated tap coefficients;

a second-system transversal filter unit including a plurality of taps, the second-system transversal filter unit generating a second-system estimated reception signal on the basis of the known signal sequence stored in the known-signal-sequence storage unit and the tap coefficients stored in the tap-coefficient storage unit;

a second-system subtracting unit for generating a second-system error signal on the basis of a difference between the reception signal and the second-system estimated reception signal; and a second-system tap-coefficient updating unit for generating updated tap coefficients on the basis of the known signal sequence, the tap coefficients and the second-system error signal to replace the tap coefficients stored in the tap-coefficient storage unit with the updated tap coefficients.

17. The method according to claim 16, further comprising the steps of:

dynamically changing the effective sections of the taps; and synthesizing tap coefficients, wherein:

the step of dynamically changing the effective sections of the taps includes:

designating a first section as the effective section out of the plurality of taps in one of the first-system transversal filter unit and the second-system transversal filter unit so that the first section is set to include the center tap, designating a second section as the effective section out of the plurality of taps in the other of the first-system transversal filter unit and the second-system transversal filter unit so that the second section is set to include the center tap, causing the first-system transversal filter unit to generate the first-system estimated reception signal for one of the first and the second sections which is set in the first-system transversal filter unit, and causing the first-system tap-coefficient updating unit to generate the updated tap coefficients to be rewritten in the tap-coefficient storage unit, and in parallel, causing the second-system transversal filter unit to generate the second-system estimated reception signal for the other of the first and the second sections which is set in the second-system transversal filter unit, and causing the second-system tap-coefficient updating unit to generate the updated tap coefficients to be rewritten in the tap-coefficient storage unit;

the step of synthesizing the tap coefficients includes:

calculating a ratio between a sum of powers of tap coefficients, which are updated for the first section, for common taps belonging to both of the first and the second sections, and a sum of powers of tap coefficients, which are updated for the second section, for the common tap belonging to both of the first and the second sections, and synthesizing the tap coefficients, which are updated for the first section, for the common tap belonging to both of the first and the second sections and the tap coefficients, which are updated for the second section, for the common tap belonging to both of the first and the second sections, according to the ratio between the sums of powers, thereby generating tap coefficients for the common tap to be rewritten in the tap-coefficient storage unit.

18. The method according to claim 16, further comprising a step of determining a tap coefficient update for determining whether to update tap coefficients or not on the basis of the first-system error signal and the second-system error signal, wherein:

the step of determining the tap coefficient update includes:

holding, for each of the first section and the second section, a first value which is a sum obtained by adding absolute values of the error signal in a predetermined number of times of update processing from a start point of one update section which includes a plurality of number of times of update processing, and a second value which is a sum obtained by adding absolute values of the error signal in a predetermined number of times of update processing immediately before an end point of the one update section, determining whether to update tap coefficients stored in the tap-coefficient storage unit or not by using the first value and the second value, for each of a tap belonging to the first section and a tap belonging to the second section, and holding, for each of the first section and the second section, a minimum value out of the sums of absolute values of the error signal in a predetermined number of times of update processing obtained until an update end point of the one update section; and the step of synthesizing the tap coefficients includes:

calculating a ratio between the two minimum values for the first section and the second section, and synthesizing the tap coefficients, which are updated for the first section, for the common tap belonging to both of the first and the second sections and the tap coefficients, which are updated for the second section, for the common tap belonging to both of the first and the second sections, according to the ratio between the minimum values, thereby generating tap coefficients for the common tap to be rewritten in the tap-coefficient storage unit.

19. The method according to claim 11, wherein a number of taps in the first section and a number of taps in the second section are smaller than a known signal sequence length of the known signal sequence.

* * * * *